(12) United States Patent
Humphris

(10) Patent No.: US 10,585,114 B2
(45) Date of Patent: *Mar. 10, 2020

(54) SCANNING PROBE SYSTEM

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,175

(22) Filed: Jul. 16, 2019

(65) Prior Publication Data

US 2020/0011893 A1    Jan. 9, 2020

Related U.S. Application Data

(63) Continuation of application No. 15/735,499, filed as application No. PCT/EP2016/063308 on Jun. 10, 2016, now Pat. No. 10,401,381.

(30) Foreign Application Priority Data

Jun. 12, 2015 (EP) ..................................... 15171911

(51) Int. Cl.
*G01Q 10/06* (2010.01)
*G01Q 20/02* (2010.01)

(52) U.S. Cl.
CPC ........... *G01Q 10/065* (2013.01); *G01Q 20/02* (2013.01)

(58) Field of Classification Search
CPC .............................. G01Q 20/02; G01Q 10/065
See application file for complete search history.

(56) References Cited

U.S. PATENT DOCUMENTS

| 5,144,150 A | 9/1992 | Yoshizumi et al. |
| 6,678,056 B2 | 1/2004 | Downs |

(Continued)

FOREIGN PATENT DOCUMENTS

| EP | 1892727 A1 | 2/2008 |
| EP | 1898204 A1 | 3/2008 |

(Continued)

OTHER PUBLICATIONS

International Search Report issued in PCT/EP2016/063308 dated Oct. 5, 2016.

(Continued)

*Primary Examiner* — Nicole M Ippolito
*Assistant Examiner* — Sean M Luck
(74) *Attorney, Agent, or Firm* — Marshall, Gerstein & Borun LLP

(57) ABSTRACT

A scanning probe system with a probe comprising a cantilever extending from a base to a free end, and a probe tip carried by the free end of the cantilever. A first driver is provided with a first driver input, the first driver arranged to drive the probe in accordance with a first drive signal at the first driver input. A second driver is provided with a second driver input, the second driver arranged to drive the probe in accordance with a second drive signal at the second driver input. A control system is arranged to control the first drive signal so that the first driver drives the base of the cantilever repeatedly towards and away from a surface of a sample in a series of cycles. A surface detector arranged to generate a surface signal for each cycle when it detects an interaction of the probe tip with the surface of the sample. The control system is also arranged to modify the second drive signal in response to receipt of the surface signal from the surface detector, the modification of the second drive signal causing the second driver to control the probe tip.

20 Claims, 19 Drawing Sheets

(56) References Cited

U.S. PATENT DOCUMENTS

| | | |
|---|---|---|
| 9,134,340 B2 | 9/2015 | Humphris |
| 2005/0050947 A1 | 3/2005 | Kitajima et al. |
| 2006/0230474 A1 | 10/2006 | Mininni et al. |
| 2008/0073519 A1 | 3/2008 | Shin et al. |
| 2011/0296561 A1 | 12/2011 | Humphris et al. |
| 2013/0110262 A1 | 5/2013 | Abramovitch et al. |
| 2014/0026263 A1 | 1/2014 | Humphris |
| 2014/0338073 A1 | 11/2014 | Plodinec et al. |
| 2015/0020244 A1 | 1/2015 | Humphris et al. |
| 2015/0241469 A1 | 8/2015 | Osborne et al. |

FOREIGN PATENT DOCUMENTS

| | | |
|---|---|---|
| WO | WO-2010/067129 A1 | 6/2010 |
| WO | WO-2015/011448 A1 | 1/2015 |
| WO | WO-2015/128459 A1 | 9/2015 |

OTHER PUBLICATIONS

Written Opinion issued in PCT/EP2016/063308 dated Oct. 5, 2016.

Dai, G. et al., "Development of a 3D-AFM for true 3D measurements of nanostructures," *Measurement Science and Technology*, vol. 22 (2011).

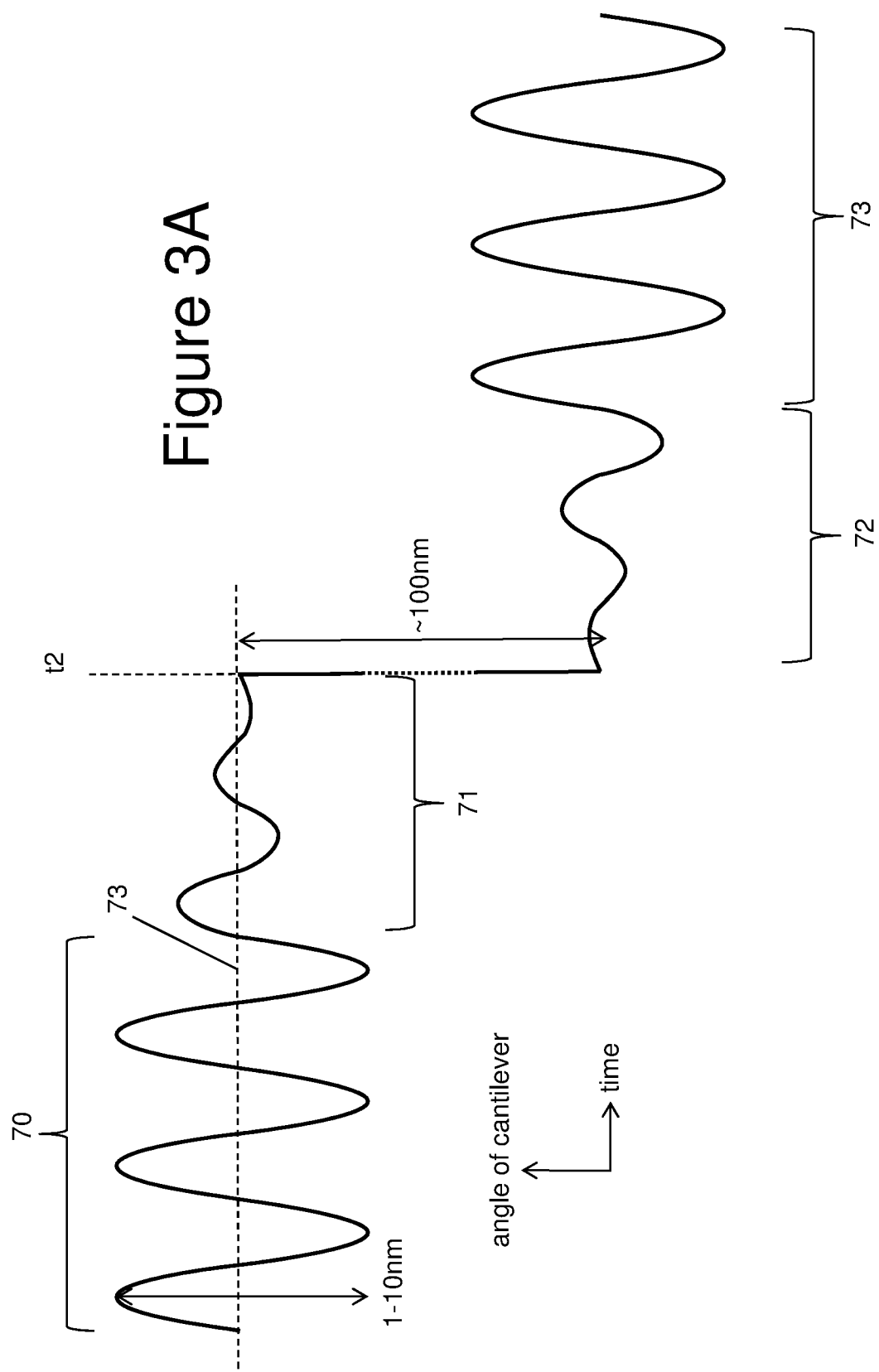

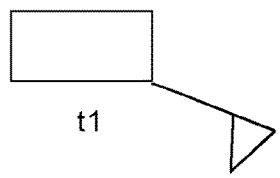
Figure 4
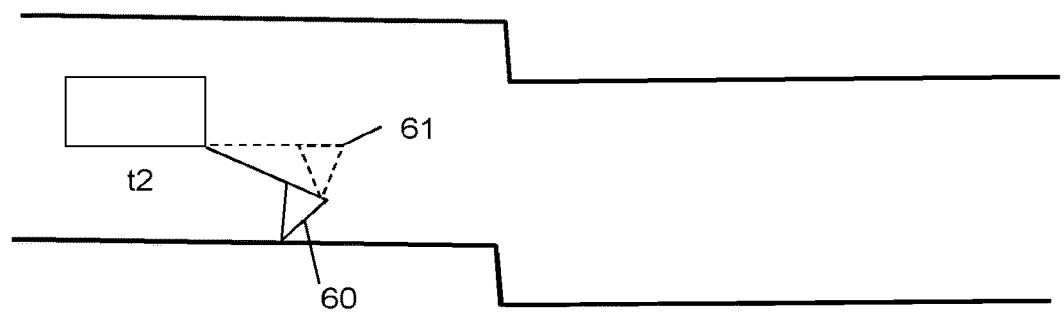
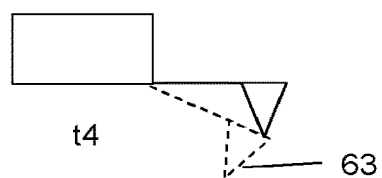
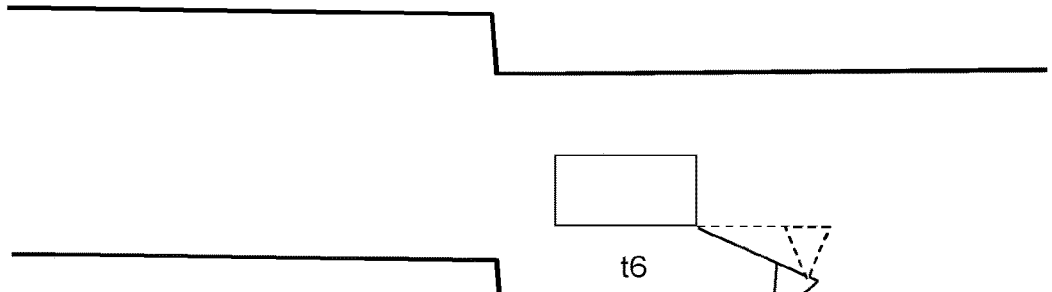
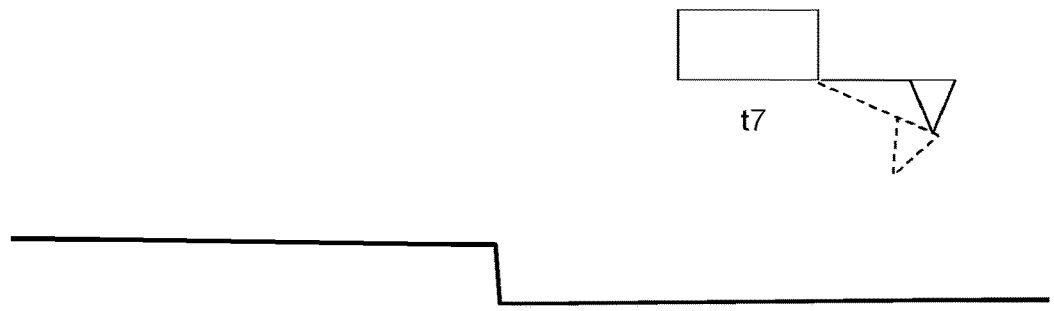

SCANNING PROBE SYSTEM

TECHNOLOGICAL FIELD

The present disclosure relates to a scanning probe system and associated method.

BACKGROUND

A known scanning probe system is described in US2014/0026263. A probe is mechanically responsive to a drive force. A signal generator provides a drive signal to an actuator that generates the drive force, the drive signal being such as to cause the actuator to move the probe repeatedly towards and away from a sample. A detection system is arranged to output a height signal indicative of a path difference between light reflected from the probe and a height reference beam. Image processing apparatus is arranged to use the height signal to form an image of the sample. Signal processing apparatus is arranged to monitor the probe as the probe approaches a sample and to detect a surface position at which the probe interacts with the sample. In response to detection of the surface position, the signal processing apparatus prompts the signal generator to modify the drive signal.

SUMMARY OF THE DISCLOSURE

A first aspect provides a scanning probe system. A second aspect provides a method of scanning a sample with a scanning probe system.

In US2014/0026263 only a single driver is used to drive the probe repeatedly towards and away from the sample. The first and second aspects use first and second drivers, and a surface signal acts as a trigger causing the second driver to control the probe tip, thereby controlling the probe tip's interaction with the surface of the sample. This enables the first and second drivers to be optimised for their respective functions, for instance the second driver having a shorter travel distance and a faster response time than the first driver.

The control system is arranged to control the first drive signal so that for each cycle the first drive signal causes the first driver to drive the probe with an approach phase before generation of the surface signal in which the first driver moves the base of the cantilever and the probe tip towards the surface of the sample; and a retract phase after generation of the surface signal in which the first driver moves the base of the cantilever and the probe tip away from the surface of the sample. The retract phase may start immediately after generation of the surface signal, but more typically there is an overshoot phase between the generation of the surface signal and the retract phase in which the first drive signal continues to cause the first driver to move the base of the cantilever and the probe tip towards the surface of the sample.

Typically the modification of the second drive signal causes the second driver to control a trajectory of the probe tip. In this case the modification of the second drive signal provides a means of accurately controlling the trajectory of the probe tip, for instance avoiding damage to the sample and/or applying a controlled force to the probe during a measurement phase immediately following the generation of the surface signal.

Typically the probe is mechanically responsive to first and second drive forces generated by the first and second drivers in accordance with the first and second drive signals.

Typically the modification of the second drive signal causes the second driver to decelerate or stop the motion of the probe tip towards the surface of the sample. After decelerating the probe tip, then optionally the second drive signal causes the second driver to accelerate the probe tip away from the surface of the sample. Alternatively the interaction of the probe tip with the surface of the sample may decelerate and stop the probe before the second drive signal is modified. In this case the modification of the second drive signal causes the second driver to control the trajectory of the probe tip in some other way—for instance immediately retracting it or holding it at a constant height during a measurement phase.

Preferably the modification of the second drive signal causes the second driver to generate a second drive force which is directed away from the surface of the sample. For example the second drive force may be a single-axis drive force directed orthogonally away from the surface of the sample, a single-axis drive force directed at an oblique angle away from the surface of the sample, a bending force which bends or unbends the cantilever away from the surface of the sample, or a torsional drive force which twists the cantilever so the probe tip rotates away from the sample.

Preferably the modification of the second drive signal causes the second driver to generate a second drive force which is at least partially in opposition to the first drive force. Optionally the first and second drive forces are single-axis drive forces which are substantially parallel so the modification of the second drive signal causes the second driver to drive the probe in direct opposition to the first drive signal. Alternatively the first and second drive forces may be non-parallel so the modification of the second drive signal causes the second driver to apply a second drive force which is only partially in opposition to the first drive force.

Optionally the first drive force generated by the first driver drives the base of the cantilever along a first drive axis. The direction of the first drive axis may be the same for each cycle, or it may vary from cycle to cycle.

Optionally the first driver is arranged to translate the base of the cantilever without rotating the base of the cantilever.

Optionally the first driver is arranged to drive the base of the cantilever without deforming the cantilever. This ensures that the action of the first driver does not change the angle of the probe tip relative to the base.

Typically the control system is arranged to control the first drive signal so that the first driver drives the probe tip over a first travel distance for each cycle, and the control system is arranged to control the second drive signal so that the second driver drives the probe tip over a second travel distance for each cycle. Typically the second travel distance is less than the first travel distance.

Optionally the control system is arranged to control the first drive signal so that the first travel distance returns to a preset value after the probe tip has traversed a step in the surface of the sample.

Preferably the modification of the second drive signal causes the cantilever to deform (e.g. bend or twist) so that the probe tip moves relative to the base of the cantilever. For instance the second driver may heat the cantilever electrically or by illumination to generate the drive force that causes it to deform. Alternatively the modification of the second drive signal may cause the cantilever to translate the probe tip and the base of the cantilever together—for instance the second driver may be a piezoelectric actuator which extends and retracts to apply a single-axis drive force to the base of the cantilever.

Preferably the modification of the first drive signal causes the cantilever to translate the probe tip and the base of the cantilever together—for instance the first driver may be a piezoelectric actuator which extends and retracts to apply a single-axis drive force to the base of the cantilever (either directly, or via the second driver which is another piezoelectric actuator carried by the first driver). Alternatively the modification of the first drive signal may cause the cantilever to deform (e.g. bend or twist) so that the probe tip moves relative to the base of the cantilever. For instance the first driver may heat the cantilever electrically or by illumination to generate the drive force that causes it to deform.

Optionally the control system is arranged to reset the second drive signal before the next cycle (for instance during the retract phase), the reset of the second drive signal causing the second driver to move the probe tip towards the surface of the sample.

Optionally the control system is arranged to control the first and second drive signals so that for each cycle there is an approach phase before generation of the surface signal in which the first driver moves the base of the cantilever and the probe tip towards the surface of the sample; a first retract phase after generation of the surface signal in which the modification of the second drive signal causes the probe tip to move away from the surface of the sample while the first driver continues to move the base of the cantilever towards the surface of the sample; and a second retract phase after the first retract phase in which the first driver moves the base of the cantilever and the probe tip away from the surface of the sample.

The second retract phase may immediately follow the first retract phase, or the control system may be arranged to control the first drive signal for each cycle so that for each cycle there is an overshoot phase between the first retract phase and the second retract phase in which the first driver moves the base of the cantilever and the probe tip towards the surface of the sample. Typically a travel distance of the probe tip towards the surface of the sample during the overshoot phase is less than a travel distance of the probe tip away from the sample during the first retract phase.

Preferably the surface detector is arranged to direct a sensing beam onto the cantilever thereby generating a reflected sensing beam which is analysed to detect the interaction of the probe tip with the surface of the sample. For example the surface detector may comprise an optical lever which measures an angle of the reflected sensing beam, or an interferometer arranged to direct a sensing beam onto the cantilever thereby generating a reflected sensing beam, combine the reflected sensing beam with a reference beam to generate an interferogram, and generate a detection signal from the interferogram.

Optionally modification of the second drive signal causes the cantilever to deform (e.g. bend or twist) so that an angle of the cantilever changes relative to the sensing beam; and the control system is arranged to control the second drive signal so that for each cycle the second drive signal remains substantially constant as the probe tip moves towards the surface of the sample until the second drive signal is modified in response to receipt of the surface signal, thereby ensuring that when the surface signal is generated the cantilever is at a predetermined angle relative to the sensing beam. This arrangement is particularly advantageous since it removes the need for calibration based on the angle of the cantilever, or enables an optical-lever surface detector to be used.

As noted above, optionally the second drive signal remains substantially constant as the probe tip moves towards the surface of the sample until it is modified in response to receipt of the surface signal. Optionally the second drive signal may oscillate slightly as the probe tip moves towards the surface of the sample to drive a small amplitude periodic motion of the probe tip—for instance with an amplitude more than 10 times (or more than 100 times) smaller than an amplitude of the motion of the base of the cantilever towards and away from the surface of the sample, and a frequency more than 10 times (or more than 100 times) higher than a frequency of the motion of the base of the cantilever towards and away from the surface of the sample. In this case the second drive signal can be considered to be substantially constant as the probe tip moves towards the surface of the sample, since the amplitude of the motion is relatively small. Also, an average of the second drive signal typically remains substantially constant as the probe tip moves towards the surface of the sample, since the second drive signal will be oscillating rapidly on either side of the average.

The first drive signal may be the same for all cycles, or alternatively the control system may be arranged to modify the first drive signal in response to receipt of the surface signal, the modification of the first drive signal causing the first driver to retract the base of the cantilever away from the surface of the sample, optionally after an overshoot phase as described above.

Preferably the first drive signal has an approach phase for each cycle before generation of the surface signal in which the probe tip follows a predetermined trajectory towards the surface of the sample.

Typically the control system is arranged to control the first drive signal before generation of the surface signal so that the first drive signal changes in a predetermined manner which is the same for each cycle. For instance the first drive signal may change at a substantially constant and predetermined rate so the probe tip moves towards the surface of the sample at a substantially constant and predetermined speed.

Preferably the system further comprises a measurement system which takes a measurement from the surface of the sample for each cycle in response to receipt of the surface signal from the surface detector. For instance each measurement may be a height measurement. Optionally the measurements may be used to determine a topography of the surface of the sample. Alternatively the measurements may be used to determine a material property (for instance stiffness) of the surface of the sample.

The measurement system may take one measurement or multiple measurements from the surface of the sample for each cycle in response to receipt of the surface signal from the surface detector.

The primary purpose of the system may be measurement of the sample, or modification of the sample (for instance nanolithography).

Optionally the measurement system comprises an interferometer arranged to direct a sensing beam onto the cantilever thereby generating a reflected sensing beam, combine the reflected sensing beam with a reference beam to generate an interferogram, and generate a detection signal from the interferogram. In one embodiment the detection signal from the interferometer is used both by the measurement system to take a measurement from the surface of the sample and by the surface detector to detect the interaction of the probe tip with the surface of the sample. Alternatively the detection signal from the interferometer is used by the measurement system to take a measurement from the surface of the sample, but it is not used by the surface detector to detect the interaction of the probe tip with the surface of the sample.

For example the surface detector may use an optical-lever based angle signal to detect the interaction of the probe tip with the surface of the sample.

The surface detector may generate multiple surface signals per cycle, but more typically the control system is arranged to control the first and second drive signals so that the surface detector generates no more than one surface signal per cycle.

Preferably each cycle of the first drive signal has substantially the same period.

The probe tip may be supported by only a single cantilever beam, or it may be supported by multiple cantilever beams, as shown by way of example in WO2015/128459.

The control system may be embodied in a single control unit such as a waveform generator, or in multiple distributed control units.

The series of cycles is preferably a continuous series of cycles—in other words each cycle in the series starts immediately after a preceding cycle in the series.

Preferably there are no cycles in the series in which a surface signal is not generated, and there are no cycles in the series in which the second drive signal is not modified in response to receipt of the surface signal.

Preferably the control system is arranged to control the first drive signal so that for each cycle the first driver moves the base of the cantilever and the probe tip away from the surface of the sample only after generation of the surface signal.

A third aspect provides a scanning probe system. In the third aspect the second drive signal remains substantially constant as the probe tip moves towards the surface of the sample until it is modified in response to receipt of the surface signal. Optionally the second drive signal may oscillate slightly as the probe tip moves towards the surface of the sample to drive a small amplitude periodic dither motion of the probe tip—for instance with an amplitude more than 10 times (or more than 100 times) smaller than an amplitude of the translation of the base of the cantilever towards and away from the surface of the sample, and a frequency more than 10 times (or more than 100 times) higher than a frequency of the translation of the base of the cantilever towards and away from the surface of the sample. In this case the second drive signal can be considered to be substantially constant as the probe tip moves towards the surface of the sample, since the amplitude of the dither motion is relatively small. Also, an average of the second drive signal typically remains substantially constant as the probe tip moves towards the surface of the sample, since the second drive signal will be oscillating rapidly on either side of the average.

A fourth aspect provides a method of scanning a sample. In the fourth aspect the angle of the cantilever relative to the sensing beam (referred to below as "the angle") remains substantially constant as the probe tip moves towards the surface of the sample until it is modified in response to receipt of the surface signal. Optionally the angle may oscillate slightly as the probe tip moves towards the surface of the sample due to a small amplitude periodic dither motion of the probe tip—for instance with an amplitude more than 10 times (or more than 100 times) smaller than an amplitude of the translation of the base of the cantilever towards and away from the surface of the sample, and a frequency more than 10 times (or more than 100 times) higher than a frequency of the translation of the base of the cantilever towards and away from the surface of the sample. In this case the angle can be considered to be substantially constant as the probe tip moves towards the surface of the sample, since the amplitude of the dither motion is relatively small. Also, an average of the angle remains substantially constant as the probe tip moves towards the surface of the sample, since the angle will be oscillating rapidly on either side of the average.

The third and fourth aspects are advantageous since they remove the need for calibration based on the angle of the cantilever, or enable an optical-lever surface detector to be used which is less expensive than an interferometer.

Changing a shape of the cantilever may comprise bending, unbending, twisting or untwisting the cantilever. The second driver may heat the cantilever electrically or by illumination, so that the modification of the second drive signal causes the cantilever to change shape. The heating of the cantilever may be increased in response to the receipt of the surface signal, but more typically it is decreased in response to the receipt of the surface signal so that the cantilever adopts a more relaxed state.

Any of the preferred features of the first and second aspects may optionally be incorporated into the third and fourth aspects respectively.

BRIEF DESCRIPTION OF THE DRAWINGS

Embodiments will now be described with reference to the accompanying drawings, in which:

FIG. 3A is a graph showing the angle of the cantilever immediately before and after generation of the surface signal;

FIG. 4 shows the probe traversing a downward step in the surface of a sample;

DETAILED DESCRIPTION OF EMBODIMENT(S)

Figure 1:
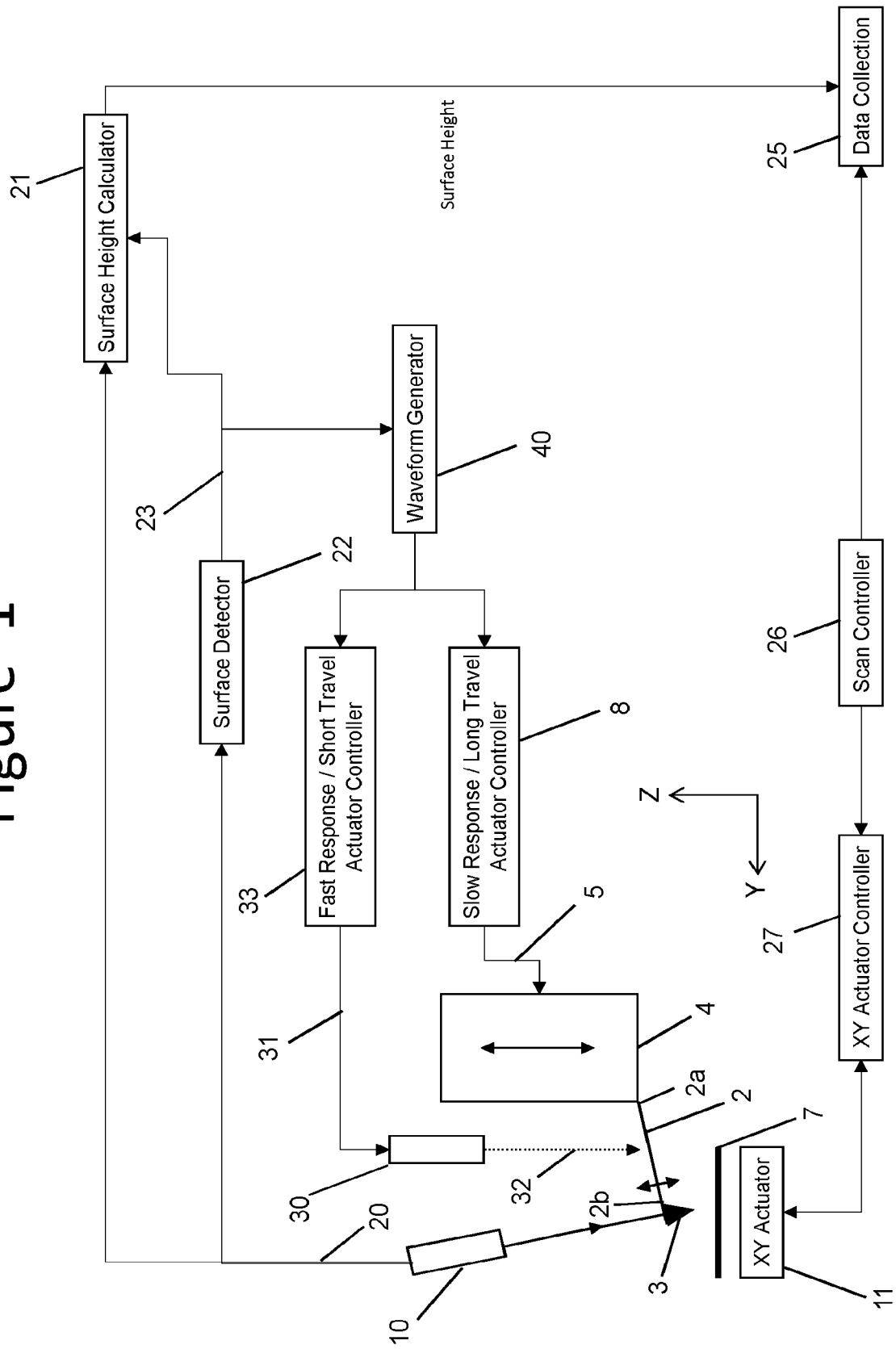
FIG. 1 shows a scanning probe microscopy system.

A scanning probe microscopy system according to a first embodiment is shown in FIG. 1. The system comprises a first driver 4 and a probe comprising a cantilever 2 and a probe tip 3. The bottom of the first driver 4 provides a support for the probe, with the cantilever 2 extending from the first driver 4 from a base 2a to a free end 2b. The probe tip 3 is carried by the free end 2b of the cantilever 2.

The probe tip 3 comprises a three dimensional, often conical or pyramidal structure. The tip tapers to a point that is its closest point of interaction with a surface under interrogation. The cantilever 2 is the beam itself, excluding the probe tip 3, which supports the probe tip 3 at its free end 2b and at its base 2a is held by the first driver 4.

The probe is generally fabricated from silicon or silicon nitride. Typically, the cantilever 2 is around 50-200 μm long, 20-50 μm wide and around 0.2-2 μm thick, but this size can of course be varied according to application. The shape may also be varied: typically it is rectangular or triangular with, in the latter case, the tip in the vicinity of its apex. The tip 3 is typically 5 μm at its base, 3-10 μm high and with an end radius of curvature of 2-20 nm. In use, the fine point at the end of the tip is oriented towards a sample 7. Alternatively the probe may have a cantilever around 5-20 μm long and 3-10 μm wide, with a correspondingly smaller tip.

The first driver 4 is a piezoelectric actuator which expands and contracts up and down in the Z-direction in accordance with a first drive signal at a first driver input 5. As described further below, the first drive signal causes the first driver 4 to move the probe repeatedly towards and away from the sample 7 in a series of cycles. The first drive signal is generated by a first controller 8. Typically the first driver 4 is mechanically guided by flexures (not shown).

Figure 2:
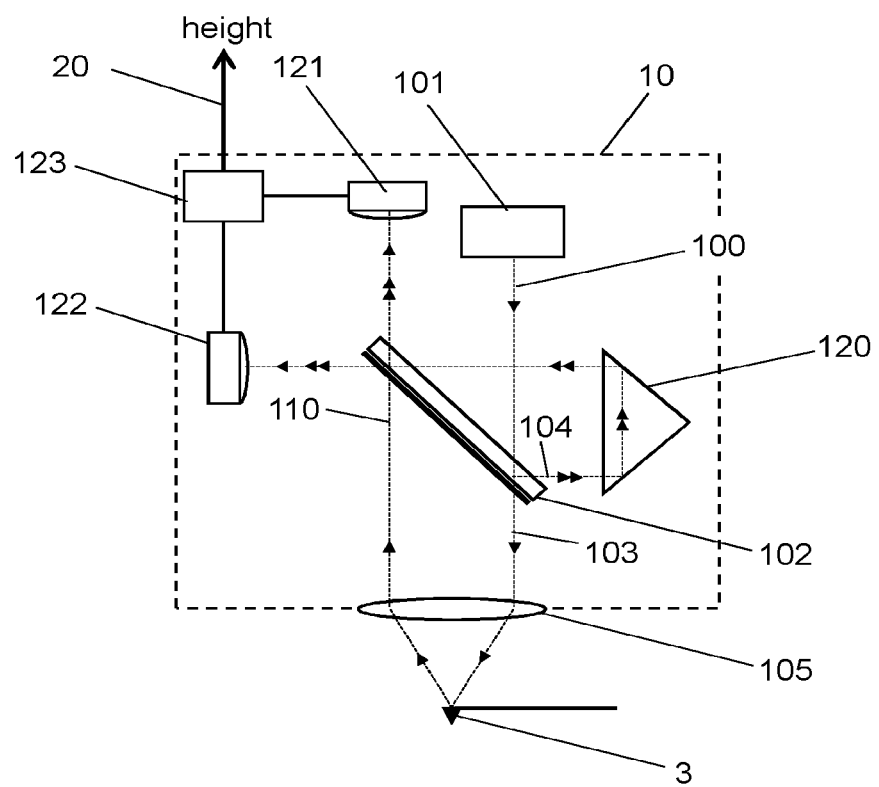
FIG. 2 is a detailed view of the detector in the system of FIG. 1.

An interferometer detector 10 is arranged to detect a height of the free end 2b of the cantilever 2 directly opposite to the probe tip 3. FIG. 1 only shows the detector 10 schematically and FIG. 2 gives a more detailed view. Light 100 from a laser 101 is split by a beam splitter 102 into a sensing beam 103 and a reference beam 104. The reference beam 104 is directed onto a suitably positioned retro-reflector 120 and thereafter back to the beam splitter 102. The retro-reflector 120 is aligned such that it provides a fixed optical path length relative to the vertical (Z) position of the sample 7. The beam splitter 102 has an energy absorbing coating and splits both incident 103 and reference 104 beams to produce first and second interferograms with a relative phase shift of 90 degrees. The two interferograms are detected respectively at first 121 and second 122 photodetectors.

Ideally, the outputs from the photodetectors 121, 122 are complementary sine and cosine signals with a phase difference of 90 degrees. Further, they should have no dc offset, have equal amplitudes and only depend on the position of the cantilever and wavelength of the laser 101. Known methods are used to monitor the outputs of the photodetectors 121, 122 while changing the optical path difference in order to determine and to apply corrections for errors arising as a result of the two photodetector outputs not being perfectly harmonic, with equal amplitude and in phase quadrature. Similarly, dc offset levels are also corrected in accordance with methods known in the art.

These photodetector outputs are suitable for use with a conventional interferometer reversible fringe counting apparatus and fringe subdividing apparatus 123, which may be provided as dedicated hardware, FPGA, DSP or as a programmed computer. Phase quadrature fringe counting apparatus is capable of measuring displacements in the position of the cantilever to an accuracy of $\lambda/8$. That is, to 66 nm for 532 nm light. Known fringe subdividing techniques, based on the arc tangent of the signals, permit an improvement in accuracy to the nanometre scale or less. In the embodiment described above, the reference beam 104 is arranged to have a fixed optical path length relative to the Z position of the sample 7. It could accordingly be reflected from the surface of a stage (not shown) on which the sample 7 is mounted or from a retro-reflector whose position is linked to that of the stage. The reference path length may be greater than or smaller than the length of the path followed by the beam 103 reflected from the probe. Alternatively, the relationship between reflector and sample Z position does not have to be fixed. In such an embodiment the reference beam may be reflected from a fixed point, the fixed point having a known (but varying) relationship with the Z position of the sample. The height of the tip is therefore deduced from the interferometically measured path difference and the Z position of the sample with respect to the fixed point.

The interferometer detector 10 is one example of a homodyne system. The particular system described offers a number of advantages to this application. The use of two phase quadrature interferograms enables the measurement of cantilever displacement over multiple fringes, and hence over a large displacement range. Examples of an interferometer based on these principles are described in U.S. Pat. No. 6,678,056 and WO2010/067129. Alternative interferometer systems capable of measuring a change in optical path length may also be employed. A suitable homodyne polarisation interferometer is described in EP 1 892 727 and a suitable heterodyne interferometer is described in U.S. Pat. No. 5,144,150.

Returning to FIG. 1, the output of the detector 10 is a height signal on a height detection line 20 which is input to a surface height calculator 21 and a surface detection unit 22. The surface detection unit 22 is arranged to generate a surface signal on a surface detector output line 23 for each cycle when it detects an interaction of the probe tip 3 with the sample 7.

The cantilever 2 is also driven by a second driver 30 with a second driver input 31. In this embodiment the second driver 30 is a laser which illuminates the cantilever with an actuation beam 32, the actuation beam 32 heating the cantilever 2 and causing it to bend down along its length so that the probe tip 3 moves down relative to the base 2a of the cantilever. Preferably the silicon nitride cantilever 2 has a gold coating on its upper surface. This gold coating thermally expands more than the silicon nitride material when heated by the actuation beam. Thus any modification of the intensity of the actuation beam 32 causes the cantilever 2 to heat up or cool down and thereby bend down or un-bend up relative to the first driver 4.

In the description below it is assumed that the cantilever 2 bends down towards the sample when the actuation beam 32 is turned on, and un-bends up away from the sample when the actuation beam 32 is turned off and the cantilever adopts a more relaxed state. However it will be appreciated that the opposite arrangement may be deployed—that is, that the cantilever may bend up away from the sample when the actuation beam 32 is turned on, and un-bend down towards the sample when the actuation beam 32 is turned off. This may be achieved by placing the gold coating on the lower surface of the cantilever rather than its upper surface.

The second driver 30 is arranged to move the cantilever 2 in accordance with a second drive signal at the second driver input 31. The second drive signal is generated by a second controller 33. As described in further detail below, a waveform generator 40 is arranged to receive the surface signal from the surface detector output line 23 and modify the second drive signal on the second driver input 31 in response to receipt of the surface signal, the modification of the second drive signal causing the second driver 30 to control the probe—more specifically to drive the probe in opposition to the first drive signal so that the probe tip 3 decelerates in Z and then retracts away from the sample 7.

Figure 3:
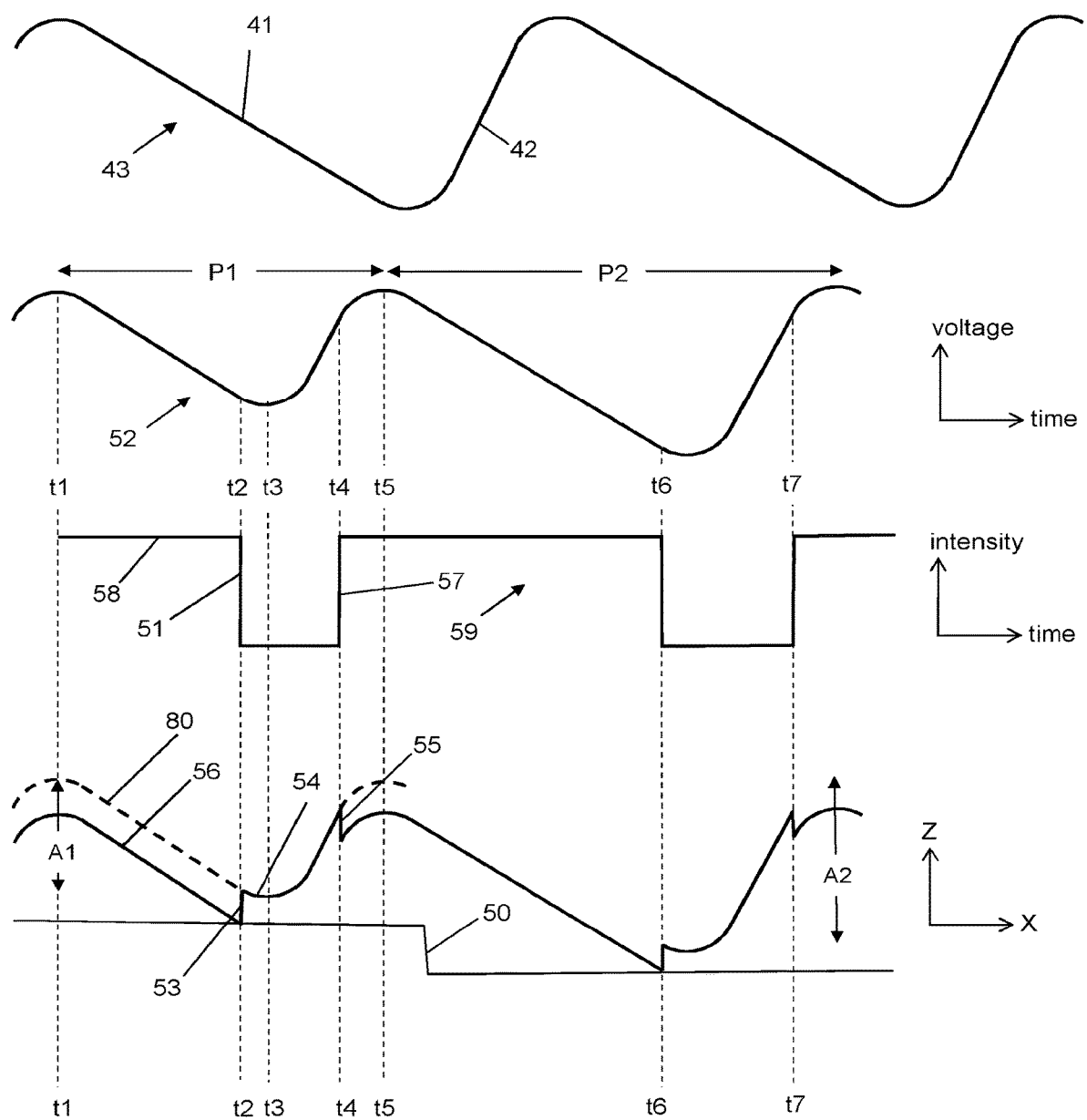
FIG. 3 shows the first and second drive signals and the associated trajectory of the probe tip.

The waveform generator 40 is arranged to control the first and second drive signals as shown in FIG. 3 during the scanning of a sample. When the probe is in free space away from the sample, then the first drive signal has an un-modified form shown at 43. The un-modified first drive signal 43 has a cyclic form, each cycle being identical. Each cycle has an approach phase 41 during which the first driver 4, the cantilever 2 and the probe tip 3 translate down together, and a retract phase 42 during which they translate up together.

At the bottom of FIG. 3 a surface of the sample 7 is shown with a step 50, and the trajectory of the probe tip 3 scanning across the surface is shown. Between time t1 and t2 there is a tip approach phase before generation of the surface signal in which the first driver 4 moves the cantilever 2 and the probe tip 3 down towards the surface of the sample. The vertical (Z) component of the probe tip trajectory 53 between t1 and t2 is driven by the first driver 4, whereas the horizontal (X) component is driven by a piezoelectric XY-actuator 11 which moves a sample stage (not shown) carrying the sample 7 under the control of a scan controller 26 and an actuator controller 27. So in this example the relative horizontal motion between the probe and the sample in the XY plane is generated by motion of the sample rather than by motion of the probe. In another embodiment the relative motion in the XY plane may be generated instead by motion of the probe (the sample remaining stationary).

The cyclic vertical motion imparted by the first driver 4 has a frequency of the order of 10 kHz and amplitude of the order of 200 nm. The raster-scanning horizontal motion in the X direction imparted by the XY-actuator 11 has a frequency of the order of 1-100 Hz and an amplitude of the order of 1 micron. Hence the vertical (Z) motion is dominant and the X and Z components of the trajectory in FIG. 3 are not to scale.

Rather than imparting a continuous raster-scanning motion, the XY-actuator 11 may instead generate a stop and step motion in which each approach/retract cycle is performed at a static location (with motion in Z but no motion imparted in X or Y by the XY-actuator). This may be preferable for very deep and narrow structures where no XY motion is desirable during the measurement cycle.

For the majority of the time between t1 and t2 the first drive signal 52 changes at a substantially constant and predetermined rate, so the probe tip 3 moves towards the surface of the sample at a substantially constant speed as indicated by straight line 56.

At time t2 the surface detection unit 22 detects an interaction of the probe tip 3 with the surface of the sample 7 and outputs the surface signal. The surface signal is generated by a resonant detection method which operates as follows. The waveform generator 40 provides a periodic dither signal which is tuned to a flexural or torsional resonance frequency of the cantilever 2. This dither signal is used to modulate the laser 30, or another photothermal actuation laser (not shown). The dither signal brings about periodic photothermal stress in the cantilever, which excites a periodic motion of typically between 1-10 nanometres in amplitude at a frequency of the order of MHz. Note that the amplitude of the periodic dither motion is much lower than the non-resonant motion generated by the second drive signal 59 on the second driver input 31 as indicated in FIG. 3 at 53 and 55. By way of example the non-resonant motion 53, 55 may have a travel distance which is 10-1000 times larger than the amplitude of the periodic dither motion.

In the example above the dither signal is tuned to a flexural or torsional resonant frequency of the cantilever 2, bringing about a periodic resonant motion, but in an alternative embodiment the dither signal may be at a different frequency so the dither motion is non-resonant.

The probe is advanced towards the surface until the tip 3 interacts with the surface, typically arising from repulsive forces but any force interaction that is present could in principle be employed. As a result a change in amplitude, phase or frequency of the periodic dither motion occurs which is detected by the surface detection unit 22 and causes the surface detection unit 22 to generate the surface signal. Other detection schemes for resonant detection are known in the art and can be implemented accordingly. For example, a torsional resonance could be employed, and the torsional motion of the probe monitored.

The surface height calculator 21, or any other suitable measurement system, measures the surface height based on the output of the interferometer 10 at the time of generation of the surface signal. Each measurement of surface height (one per cycle) is triggered by the surface signal and sent by the surface height calculator 21 to a data collection unit 25.

During the tip approach phase between time t1 and time t2 the second drive signal is high, so the actuation beam 32 is on and the cantilever has a bent shape as shown at the top of FIG. 4. The surface signal at time t2 acts as a trigger for the waveform generator 40 to modify the second drive signal 59 on the second driver input 31 as indicated in FIG. 3 at 51 so the second drive signal goes from high to low (turning off the actuation beam 32). This modification of the second drive signal causes the cantilever 2 to cool and the probe tip 3 to retract away from the sample 7 from the surface position 60 (FIG. 4) to the retracted position 61 shown in dashed lines. During this cantilever retract phase immediately after generation of the surface signal at time t2 the cantilever 2 deforms by un-bending as shown in FIG. 4, whilst the first drive signal is continuing to drive the base 2a of the cantilever down. So the modification 51 of the second drive signal causes the second driver 30 to drive the probe up in opposition to the first drive signal which continues to drive the probe down towards the sample 7. This modification 51 of the second drive signal 59 causes the probe tip 3 to rapidly decelerate and then rapidly retract away from the surface of the sample while the first driver 4 continues to move the base 2a of the cantilever down slowly towards the surface of the sample.

The waveform generator 40 is also arranged to modify the first drive signal in response to receipt of the surface signal, the modification of the first drive signal causing the first driver 4 to decelerate more slowly than the deceleration caused by the modification of the second drive signal, and then retract the base of the cantilever away from the sample. The modified first drive signal is indicated at 52 in FIG. 3. The first drive signal 52 is modified more slowly than the second drive signal 59 in response to the receipt of the surface signal because the maximum rate of deceleration of the first driver 4 may be limited by a number of factors—for instance the size and weight of the piezoelectric actuator, or other parts of the system such as the connection between the cantilever and the bottom of the piezoelectric actuator. Modifying the first drive signal slowly ensures a controlled motion, for example, avoiding the generation of undesirable resonances.

At time t2 the waveform generator 40 modifies the first drive signal on the first driver input 5 so the rate of change of the first drive signal gradually reverses polarity—in other words the first driver 4 reverses from driving the base of the cantilever down and towards the sample in approach phase between t1 and t3, to driving the base of the cantilever up and away from the sample in a retract phase between time t3 and t5.

Unlike the second drive signal which is modified rapidly at time t2 as indicated at 51 so that the probe tip decelerates quickly, this reversal of the first drive signal is more gradual so there is an overshoot phase between time t2 and time t3 in which the first driver 4 and the base 2a of the cantilever decelerates slowly and continues to move towards the sample surface. In the cantilever retract phase mentioned above, the cantilever 2 is rapidly un-bending so although the first driver 4 and the base 2a of the cantilever 2 are still moving slowly towards the sample, the motion of the probe tip 3 due to the un-bending is dominant so that the overall motion of the probe tip 3 is a rapid deceleration followed by a rapid retraction as indicated at 53 in FIG. 3. However once the cantilever 2 has become fully un-bent, then the motion of the probe tip 3 is controlled by the first driver 4 so that in the rest of the overshoot phase between time t2 and t3 the Z-motion of the probe tip 3 reverses so that it starts moving down again towards the surface of the sample as indicated at 54 in FIG. 3.

At time t3 at the end of the overshoot phase the first driver 4 has reached its low point for this cycle and is stationary in Z. The first driver 4 then retracts the probe up and away from the sample surface in a support retract phase from time t3 to time t5.

During the first part of the retract phase between time t3 and t4 the cantilever 2 is un-bent. At time t4 the waveform generator 40 resets the second drive signal as indicated at 57. Resetting of the second drive signal cause the actuation beam 32 to turn on again. This causes the cantilever 2 to become bent again as indicated in dashed lines in FIG. 4 at 63 and the probe tip 3 to move rapidly towards the sample as indicated at 55 in FIG. 3. This resetting of the second drive signal is performed during the retract phase at time t4 before the beginning of the next cycle of the first drive signal, or it may be performed at time t5 at the end of the retract phase.

In the next cycle the probe has traversed the step 50 in the surface of the sample, so when the surface signal for that cycle is generated at time t6, the base 2a of the cantilever has moved down further than in the previous cycle. At time t7 the second drive signal is reset.

An advantage of the drive method shown in FIGS. 3 and 4 is that for each cycle the second drive signal remains substantially constant as indicated at 58 as the probe moves towards the surface of the sample (between time t1 and time t2) until the second drive signal is modified at time t2 in response to receipt of the surface signal. This ensures that when the surface signal is detected, the cantilever 2 is at a known angle relative to the sensing beam 103 of the interferometer detector 10. In other words, at the time of detection of the surface position (t2 or t6) the actuation beam 32 is on and the cantilever 2 is bent down by a predetermined amount. Thus the angle of the cantilever 2 relative to the sensing beam 103 of the interferometer detector 10 is the same for each cycle at the time of detection of the surface position. This is advantageous because it means that no correction of the output of the interferometer detector 10 is required.

FIG. 3A is a graph showing the angle of the cantilever relative to the sensing beam 103 immediately before and after surface detection at time t2. As mentioned above, a periodic dither signal is used to modulate the actuation beam 32 from the laser 30, or another photothermal actuation laser (not shown) and this periodic dither signal causes the cantilever to oscillate with a periodic dither motion of typically between 1-10 nanometres in amplitude at a frequency of the order of MHz. This periodic dither motion can be seen in FIG. 3A, which show three cycles 70 of the periodic dither motion at full amplitude in free space, then the interaction with the sample causes the amplitude to reduce over the course of two further cycles 71 until the surface is detected at time t2 and the cantilever unbends rapidly with a travel distance of the order of 100 nm. The unbent cantilever then returns to the steady state amplitude of 1-10 nm over a number of cycles 72, i.e. ringing up which will depend on the Quality Factor. The unbent cantilever then continues to oscillate as shown with the full free space amplitude of 1-10 nm as indicated at 73.

The exact trajectory of the probe will depend on many factors, such as the nature of the interaction of the sample and the speed of approach. The interaction could take place over more or fewer cycles than shown in FIG. 3A at 71. There would also be a time constant related to the relaxation of the probe.

The angle oscillates slightly as shown at 70 as the probe tip moves towards the surface of the sample due to the small amplitude periodic dither motion of the probe tip. However the angle can be considered to be substantially constant as the probe tip moves towards the surface of the sample, since the amplitude of the dither motion shown in FIG. 3A is very small compared with the amplitude of the translation of the base of the cantilever towards and away from the surface of the sample. FIG. 3 includes a dashed line 80 indicating this translation of the base of the cantilever towards and away from the surface of the sample driven by the first drive signal 52. The amplitude of this motion is labelled A1 for the first cycle and A2 for the last cycle. The amplitude A1, A2 is typically of the order of 500-1000 nm, and is hence much larger than the 1-10 nm amplitude of the dither motion shown in FIG. 3A. Similarly the retraction of the probe tip at time t2, indicated at 53 in FIG. 3, is of the order of 100 nm and hence also much larger than the 1-10 nm amplitude of the dither motion shown in FIG. 3A.

An average angle 73 of the cantilever relative to the sensing beam remains substantially constant as the probe tip and the base of the cantilever translate together towards the surface of the sample, since the angle will be oscillating rapidly on either side of the average 73 as shown in FIG. 3A, at a frequency of the order of MHz which is much higher than the frequency of the translation of the base of the cantilever towards and away from the surface of the sample—of the order of 10 kHz. The same is true of the second drive signal 59—that is, the waveform generator 40 is arranged to control the second drive signal 59 so that an average of the second drive signal remains substantially constant as the probe tip and the base of the cantilever translate together towards the surface of the sample.

In response to receipt of the surface signal at times t2 and t6, the shape of the cantilever is changed so that the angle of the cantilever relative to the sensing beam 103 changes. In the example given above the heating of the cantilever is decreased in response to the receipt of the surface signal, by turning off the actuation beam 32. This causes the cantilever to adopt a more relaxed state (in this case—by unbending). In an alternative embodiment the heating of the cantilever may instead be increased in response to the receipt of the surface signal. In other words the actuation beam 32 may be turned on, rather than off, at time t2 and t6.

In the embodiment of FIGS. 1 and 2 the height signal from the interferometer is used both by the surface height calculator 21 to take a measurement from the surface of the sample and by the surface detection unit 22 to detect the interaction of the probe tip with the surface of the sample. In the further embodiment of FIGS. 5 and 6, the height signal from an interferometer is used by the surface height calculator 21 to take a measurement from the surface of the sample, but it is not used by the surface detection unit to detect the interaction of the probe tip with the surface of the sample. Rather, the surface detection uses an optical-lever based angle signal 124 to detect the interaction of the probe tip with the surface of the sample. In other words, the optical-lever based angle signal 124 is used to detect the surface position rather than the interferometer based height signal 20. In this case, the reflected beam from the cantilever is split by a beam splitter 106 into first and second components 107, 110. The first component 107 is directed to a segmented photodiode 108 via a lens 109, and the second component 110 is split by the beam splitter 102 and directed to the photodiodes 121, 122 for generation of the height signal on the output line 20.

Figure 5:
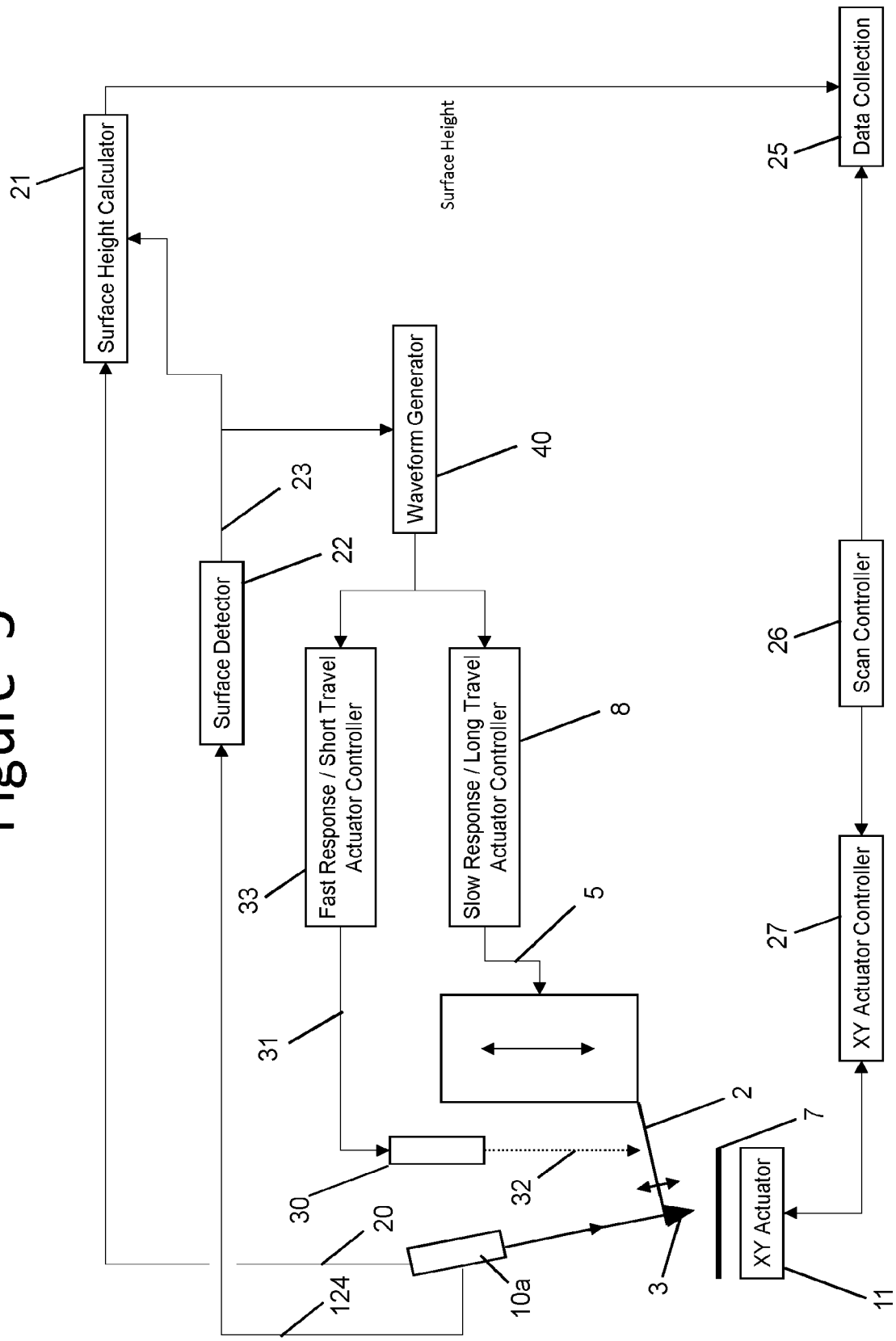
FIG. 5 shows a scanning probe microscopy system according to a further embodiment.
Figure 6:
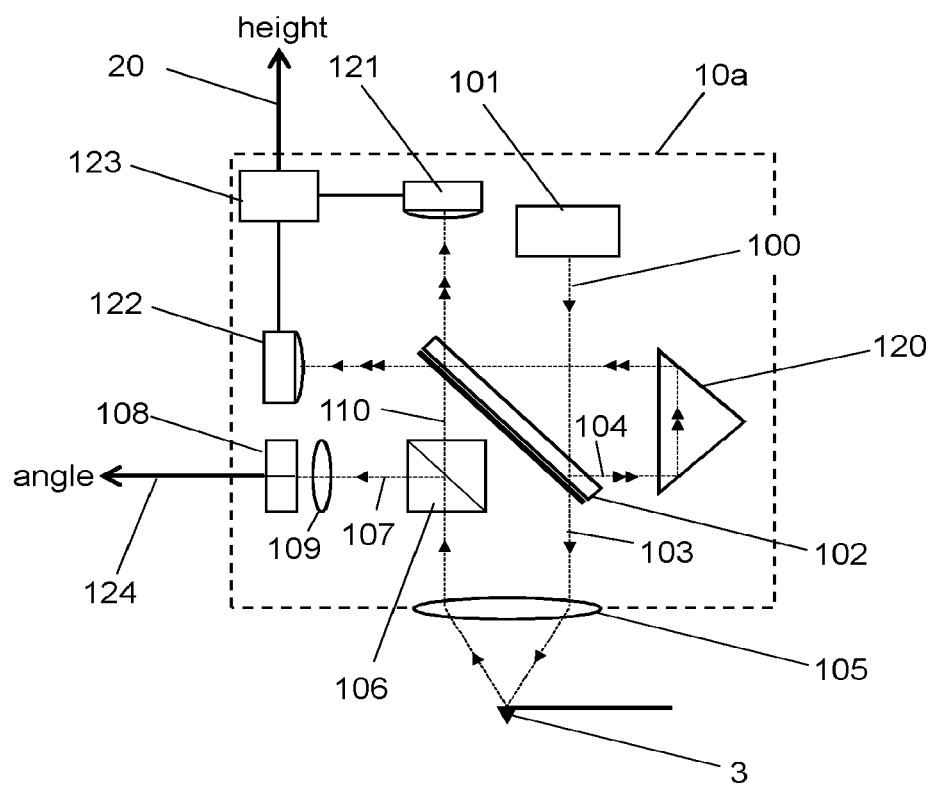
FIG. 6 is a detailed view of the detector in the system of FIG. 5.

The embodiment of FIGS. 5 and 6 can optionally use a DC threshold detection method to generate the surface signal rather than the resonant detection method described above in relation to FIG. 1. No dither signal is applied by the waveform generator 40, and the segmented photodiode 108 is used instead to provide an angle signal 124 which is input to the surface detection unit 22. The segmented photodiode 108 is split into a number of segments (typically four). If the angle of the cantilever 2 changes, then the position of the reflected beam on the photodiode 108 also changes. So the relative outputs of the segments of the segmented photodiode 108 gives an indication of the angle of the cantilever relative to the sensing beam 103. This is output as an angle signal on output line 124.

As mentioned above, during the approach phase between time t1 and time t2 the angle of the cantilever 2 is substantially constant. At time t2 the probe tip 3 interacts with the surface of the sample 7 which causes the cantilever 2 to bend up. When the angle of the cantilever 2 (as measured by the angle signal on output line 124) changes by more than a preset DC threshold, then the surface detection unit 22 generates the surface signal.

Figure 7:
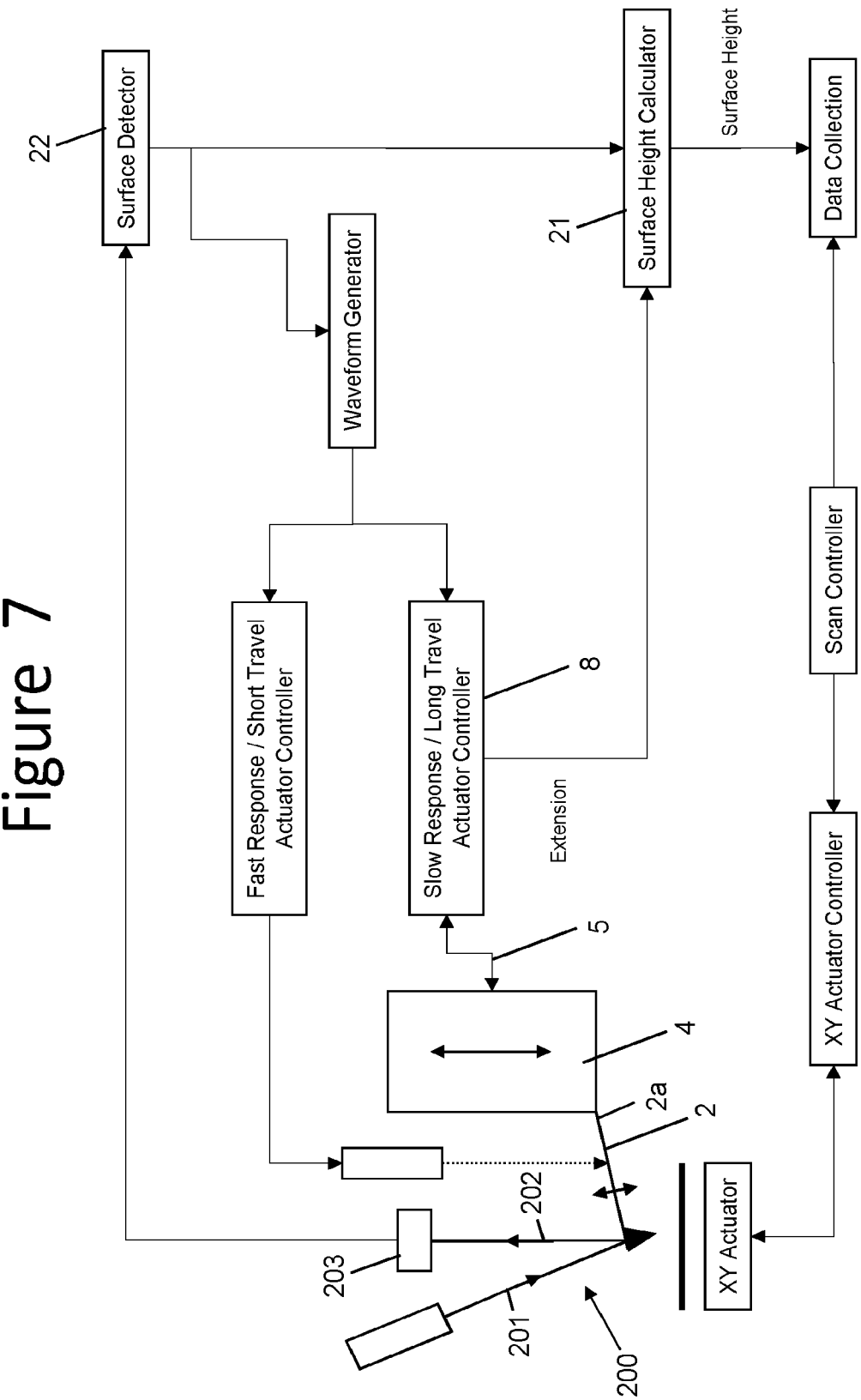
FIGS. 7-9 show scanning probe microscopy systems according to further embodiments.

FIG. 7 shows a scanning probe microscopy system according to a further embodiment. Many of the elements of FIG. 7 have equivalents in FIGS. 1, 2, 5 and 6 and the same reference number is used to indicate equivalent components.

The detector 10a of FIG. 6 incorporates a pair of photodiodes 121, 122 for detecting the height of the probe by interferometry, and a segmented photodiode 108 for detecting the angle of the probe by means of an optical lever. In the embodiment of FIG. 7 the detector 10a is replaced by a detector 200 which only detects an angle of the probe by means of an optical lever. Thus the detector 200 consists of a laser which directs a sensing beam 201 onto the cantilever, and a reflected beam 202 falls onto a segmented photodiode 203 which operates in a similar fashion to the segmented photodiode 108 described above.

The angle signal output from the detector 200 is fed to the surface detection unit 22 which generates a surface position signal using either the previously described resonant detection method or the previously described DC threshold detection method.

In the case of the previous embodiments, the surface height calculator 21 measures the surface height based on the height signal 20 output from the interferometer at the time of generation of the surface signal. In the case of FIG. 7 the surface height calculator 21 instead measures the surface height based on the piezoelectric movement of the first driver 4. That is, the surface height calculator 21 measures the surface height for each cycle based on the value of the first drive signal at the first driver input 5 at the time of generation of the surface signal. Alternatively there may be a sensor, such as a strain gauge, on the first driver 4 which measures its extension. This sensor could be used to control the first driver 4 and also provide a measurement of its position/extension for the determination of the surface height. The signals from the strain gauge sensor may be output on the line 5 (which is therefore shown as a double-headed arrow) and then passed on to the height calculator 21.

Note that the embodiment of FIG. 7 is particularly preferred since it reduces the complexity by removing the need for an interferometer-based detection system. Importantly, the angle of the cantilever does not change during the approach phase so its change of angle caused by the sample at the point of surface detection, as measured by the optical-lever based detector 200, can be used to generate the surface position signal.

Figure 8:
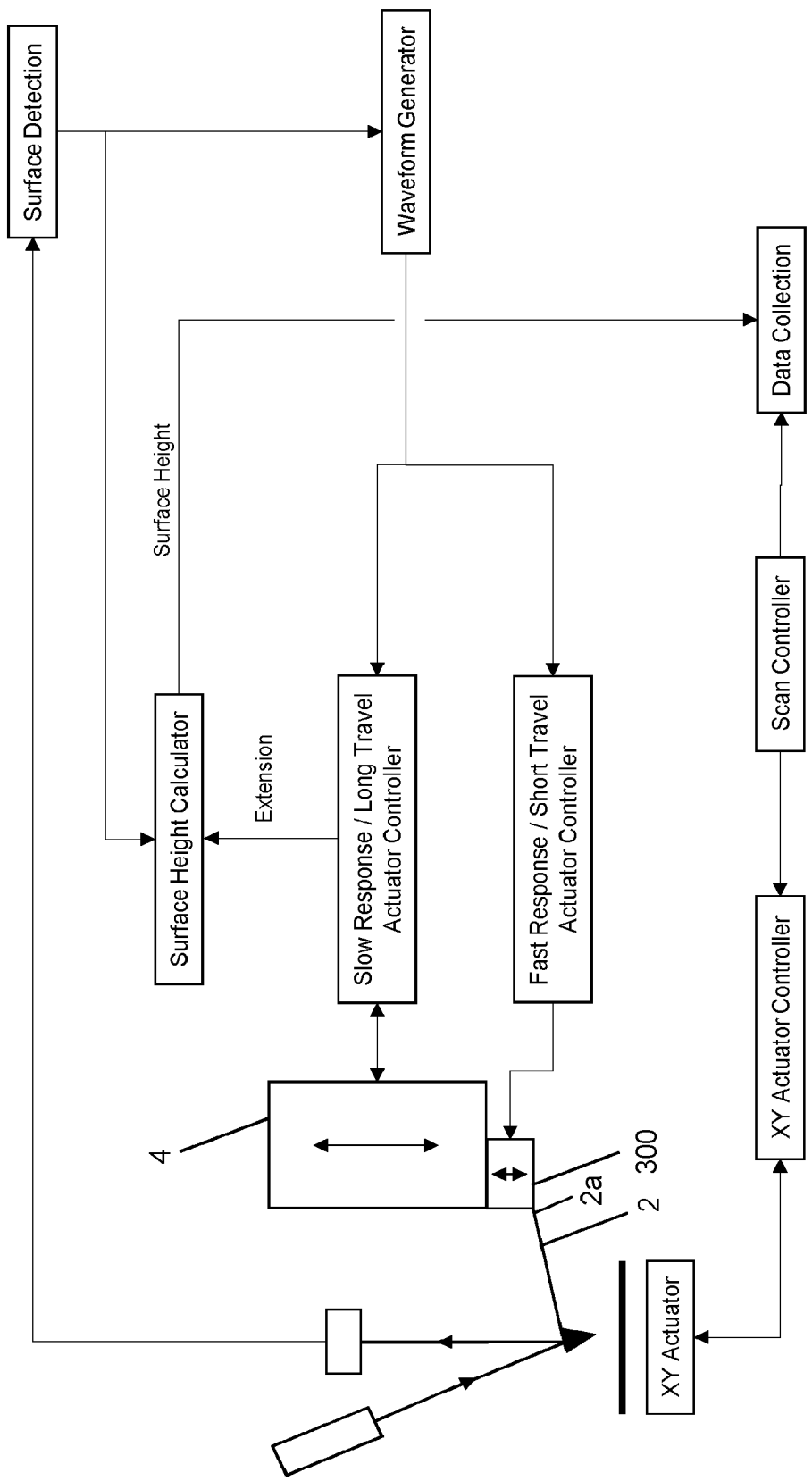

FIG. 8 shows a scanning probe microscopy system according to a further embodiment. Many of the elements of FIG. 8 have equivalent components described earlier and the same reference number is used to indicate equivalent components.

In the previous embodiments the second driver 30 drives the probe photothermally by means of an actuation beam 32. In the case of FIG. 8 the second driver is instead a second piezoelectric actuator 300. The bottom of the second piezoelectric actuator 300 provides the support for the probe, with the cantilever 2 extending from the second piezoelectric actuator 300. The second piezoelectric actuator 300 is supported in turn by the first piezoelectric actuator 4. Thus the first and second piezoelectric actuators 4, 300 in FIG. 8 have a nested arrangement—the first actuator 4 moving both the second actuator 300 and the probe. The second actuator 300 is smaller than the first actuator 4 and therefore capable of operating at a higher frequency. Conversely the first actuator 4 is larger than the second actuator 300 and therefore capable of moving over a greater travel distance.

The system of FIG. 8 operates in a similar manner to the previous embodiments—the second actuator 300 providing the same function as the second driver 30.

Figure 9:
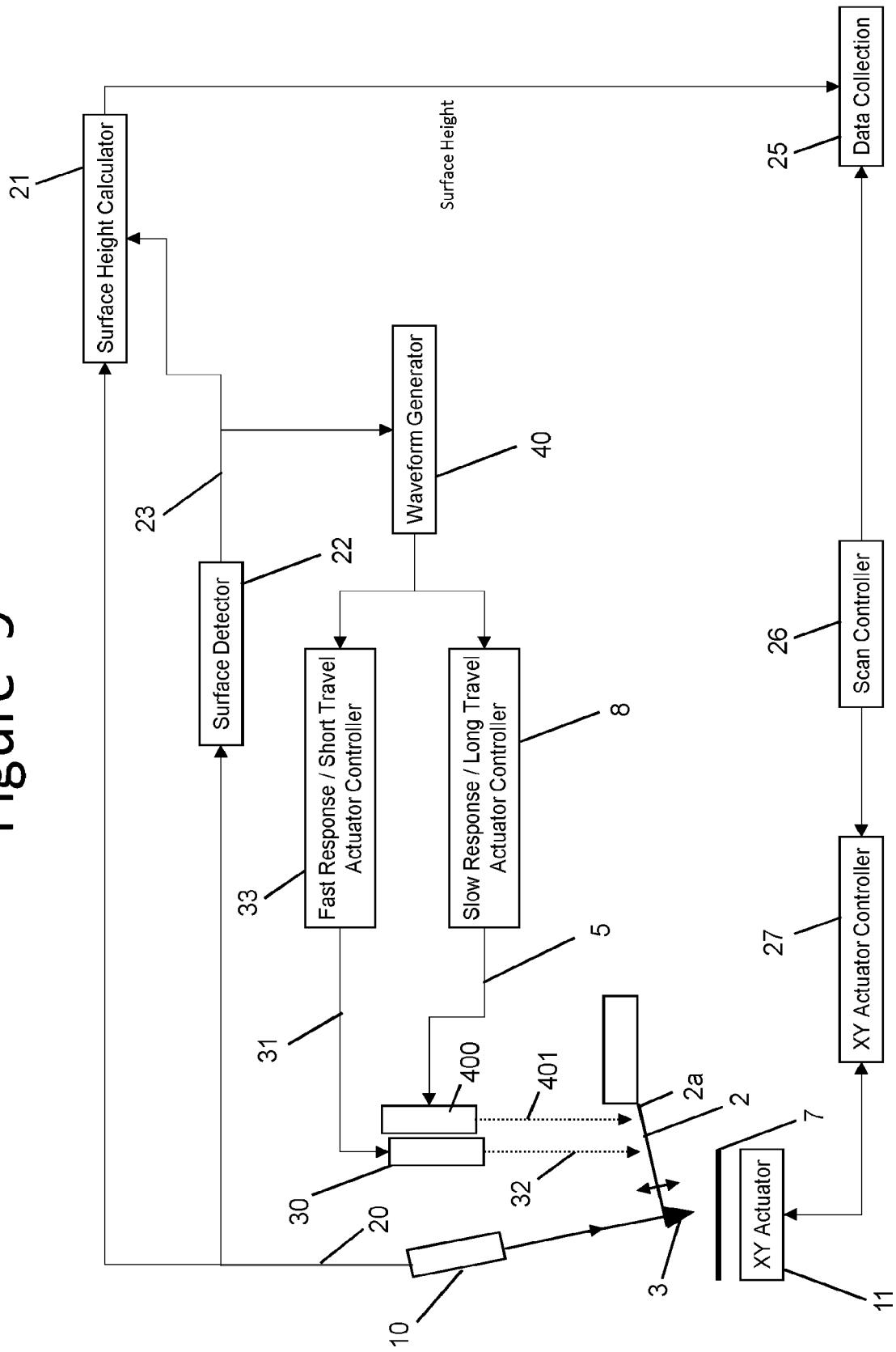

FIG. 9 shows a scanning probe microscopy system according to a further embodiment. Many of the elements of FIG. 9 have equivalent components described earlier and the same reference number is used to indicate equivalent components.

In the previous embodiments the first driver 4 is a piezoelectric driver which provides a support for the probe and translates the probe 2, 3 up and down in the Z-direction. In the embodiment of FIG. 9 the piezoelectric actuator 4 is replaced by a photothermal driver 400. The photothermal driver 400 is a laser which illuminates the cantilever with an actuation beam 401, the actuation beam 401 heating the cantilever 2 and causing it to bend down along its length.

The actuation beam 32 from the photothermal driver 30 illuminates the cantilever further from its base 2a than the actuation beam 401 from the photothermal driver 400. The cantilever 2 is therefore capable of being driven at a higher frequency by the actuation beam 32 than by the actuation beam 401. Conversely the actuation beam 401 from the photothermal driver 400 illuminates the cantilever closer to its base 2a than the actuation beam 32 from the photothermal driver 30. The probe tip 3 is therefore capable of being driven over a larger travel distance by the actuation beam 401 than by the actuation beam 32.

Optionally the cantilever 2 is wider towards its base 2a than its free end, so the width of the cantilever 2 at the point of illumination by the beam 401 is greater than the width the width of the cantilever at the point of illumination by the beam 32. An example of a suitable shape for the cantilever is given in FIG. 8 of US2015/0020244, for example.

The system of FIG. 9 operates in a similar manner to the previous embodiments—the photothermal driver 400 providing the same function as the piezoelectric first actuator 4.

Figure 10:
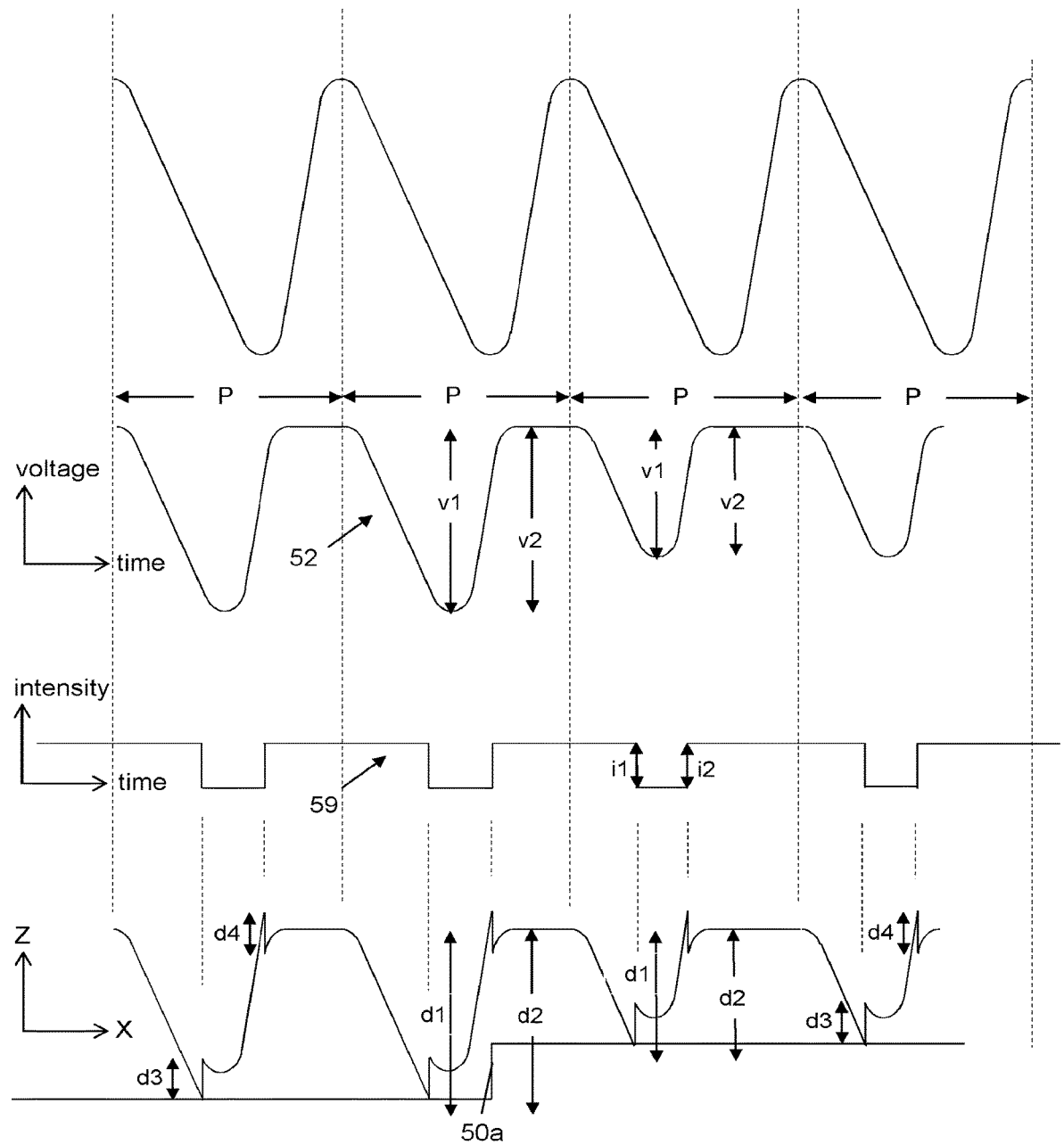
FIGS. 10-12 show the first and second drive signals and the associated trajectory of the probe tip according to further embodiments.

FIG. 10 shows an alternative method for the waveform generator 40 to control the first and second drive signals during the scanning of a sample. The first drive signal 52 applies a voltage change (v1+v2) for each cycle which causes the base 2a of the cantilever to move over an associated first travel distance (d1+d2). Similarly the second drive signal 59 applies an intensity change (i1+i2) for each cycle which causes the probe tip 3 to move up and down over an associated second travel distance (d3+d4). The second travel distance (d3+d4) is less than the first travel distance (d1+d2) for each cycle. After the step 50a the first travel distance (d1+d2) imparted by the first driver reduces but remains greater than the second travel distance (d3+d4) imparted by the second driver.

In FIG. 3 the first drive signal starts the next approach phase immediately at the end of the preceding retract phase so the period P2 of the second cycle is longer than the period P1 of the first cycle. In FIG. 10 there is a hold phase for the first drive signal at the end of each retract phase, and the length of each hold phase is controlled so that the period P of each cycle is the same.

Figure 11:
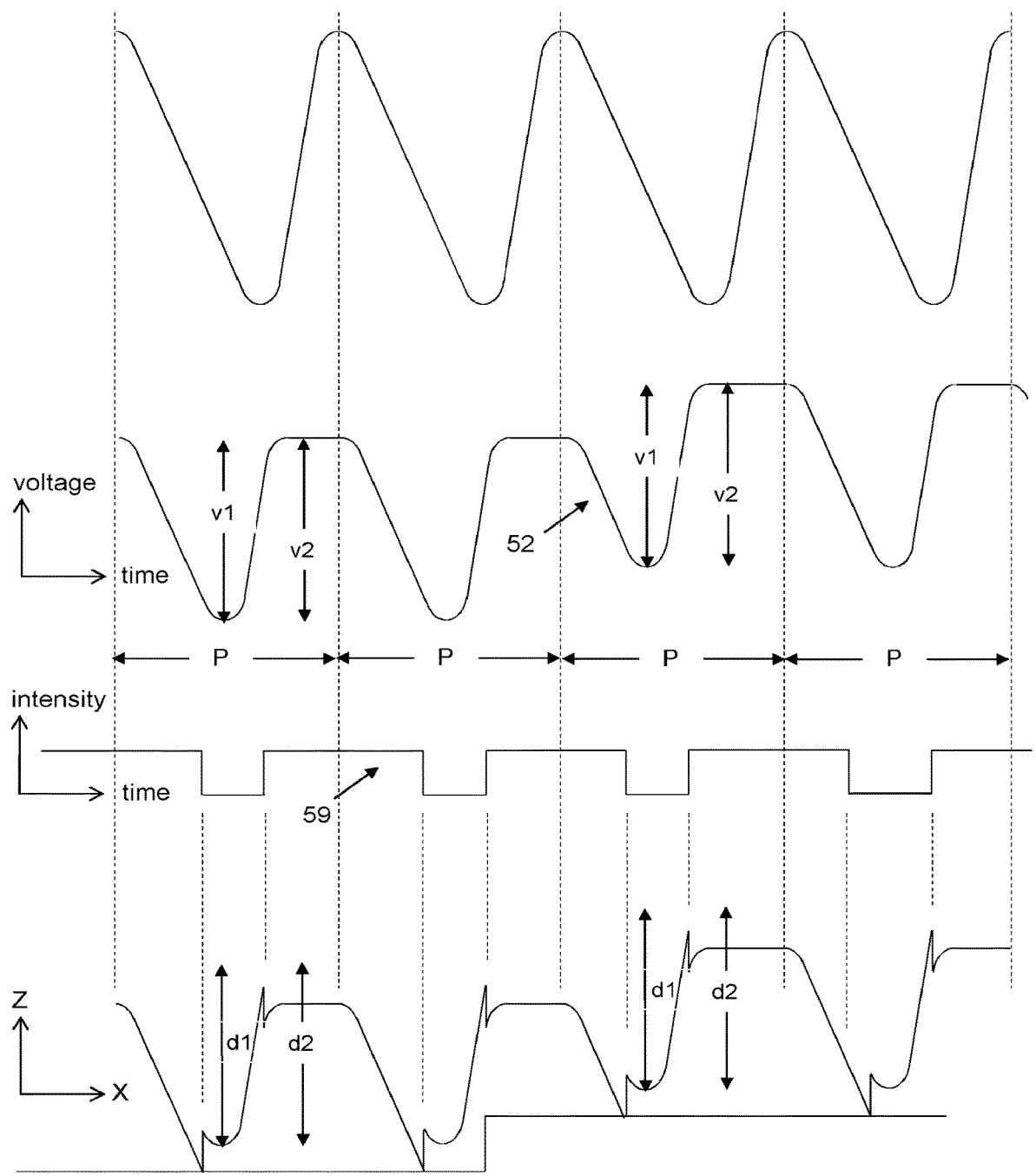

FIG. 11 shows an alternative method for the waveform generator 40 to control the first and second drive signals during the scanning of a sample. The voltage change (v1+v2) and associated first travel distance (d1+d2) reduce for one cycle at the step 50a, and then immediately return to a preset value for the next cycle.

Figure 12:
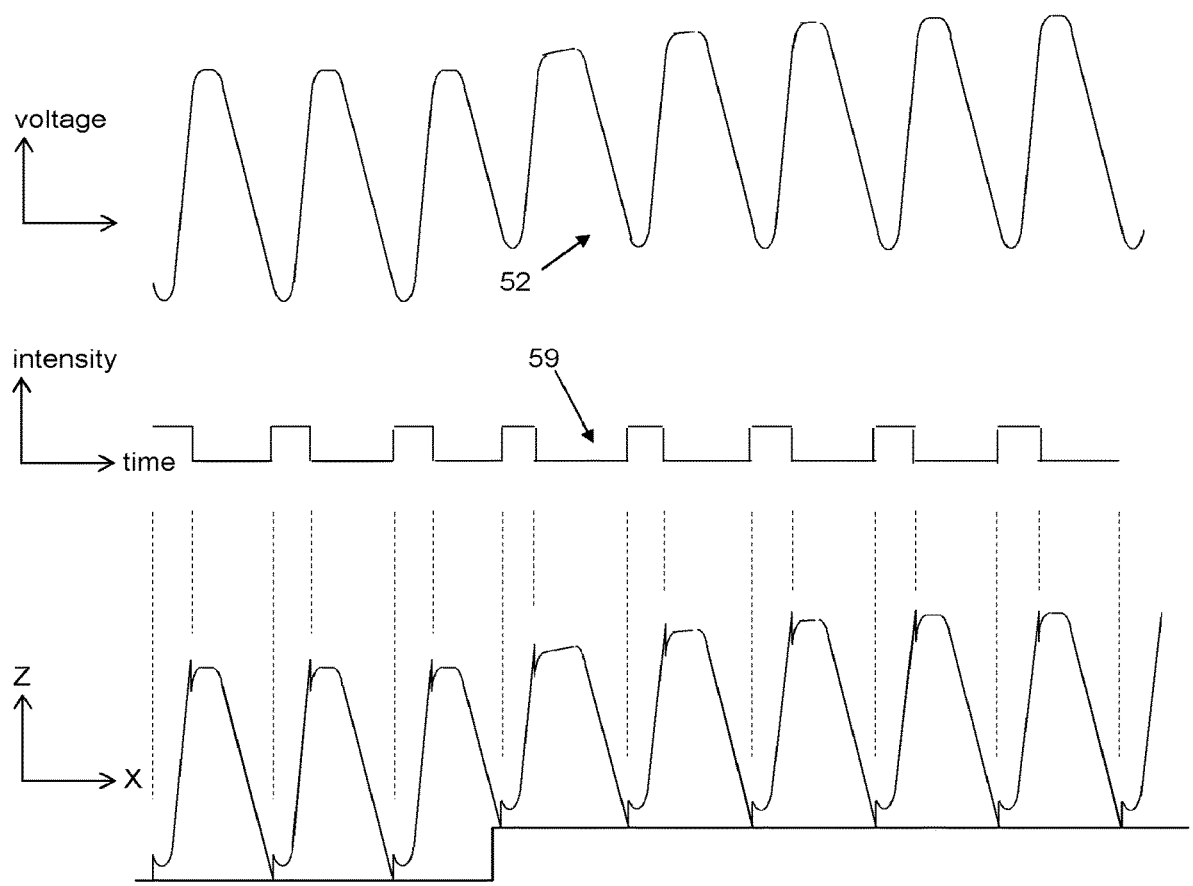

FIG. 12 shows an alternative method for the waveform generator 40 to control the first and second drive signals during the scanning of a sample. The voltage change (v1+v2) and associated first travel distance (d1+d2) reduce at the step 50a and return more gradually to the preset value (in this case over the course of about four cycles).

Figure 13:
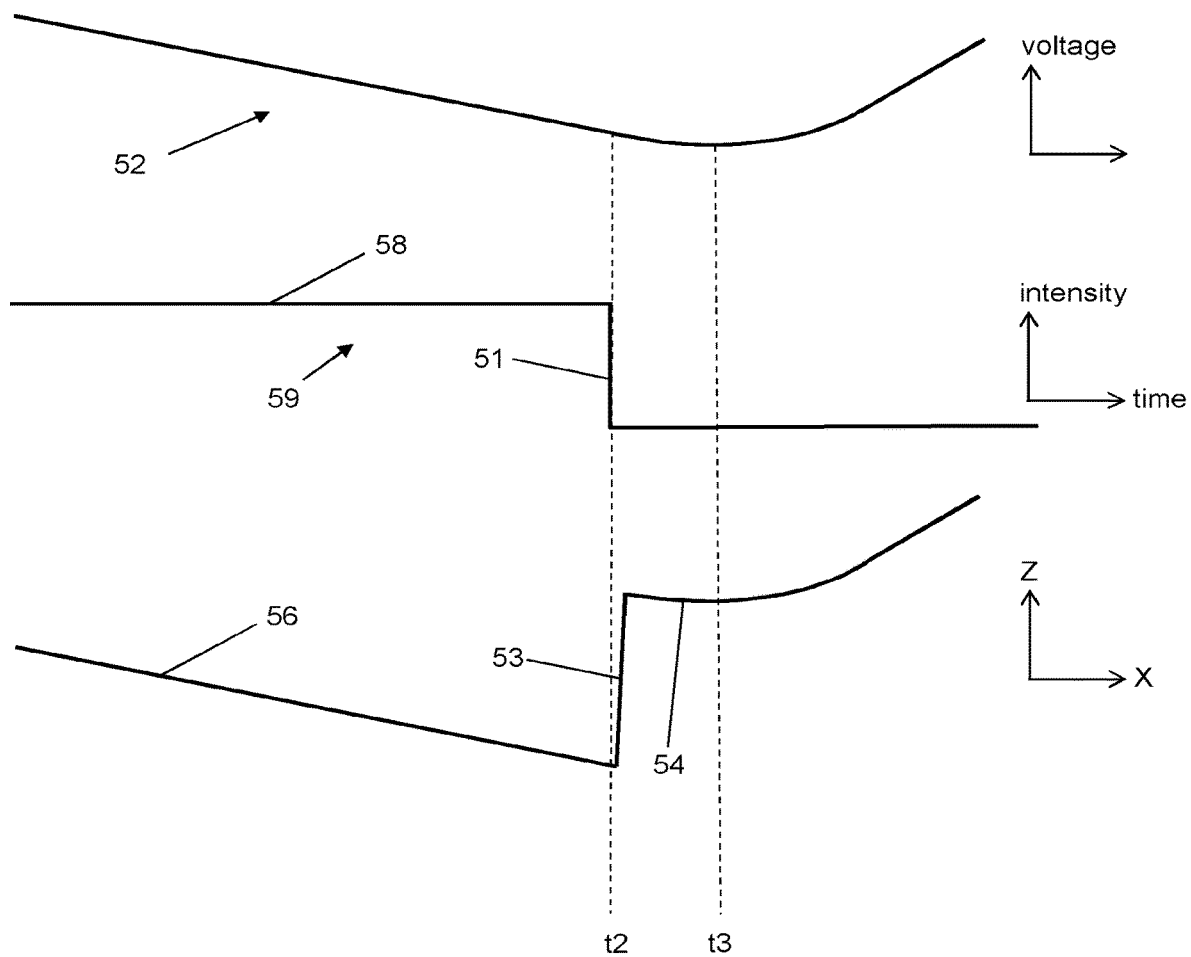
FIGS. 13-15 are enlarged views showing the first and second drive signals and the associated trajectory of the probe tip according to further embodiments after generation of the surface position signal.
Figure 14:
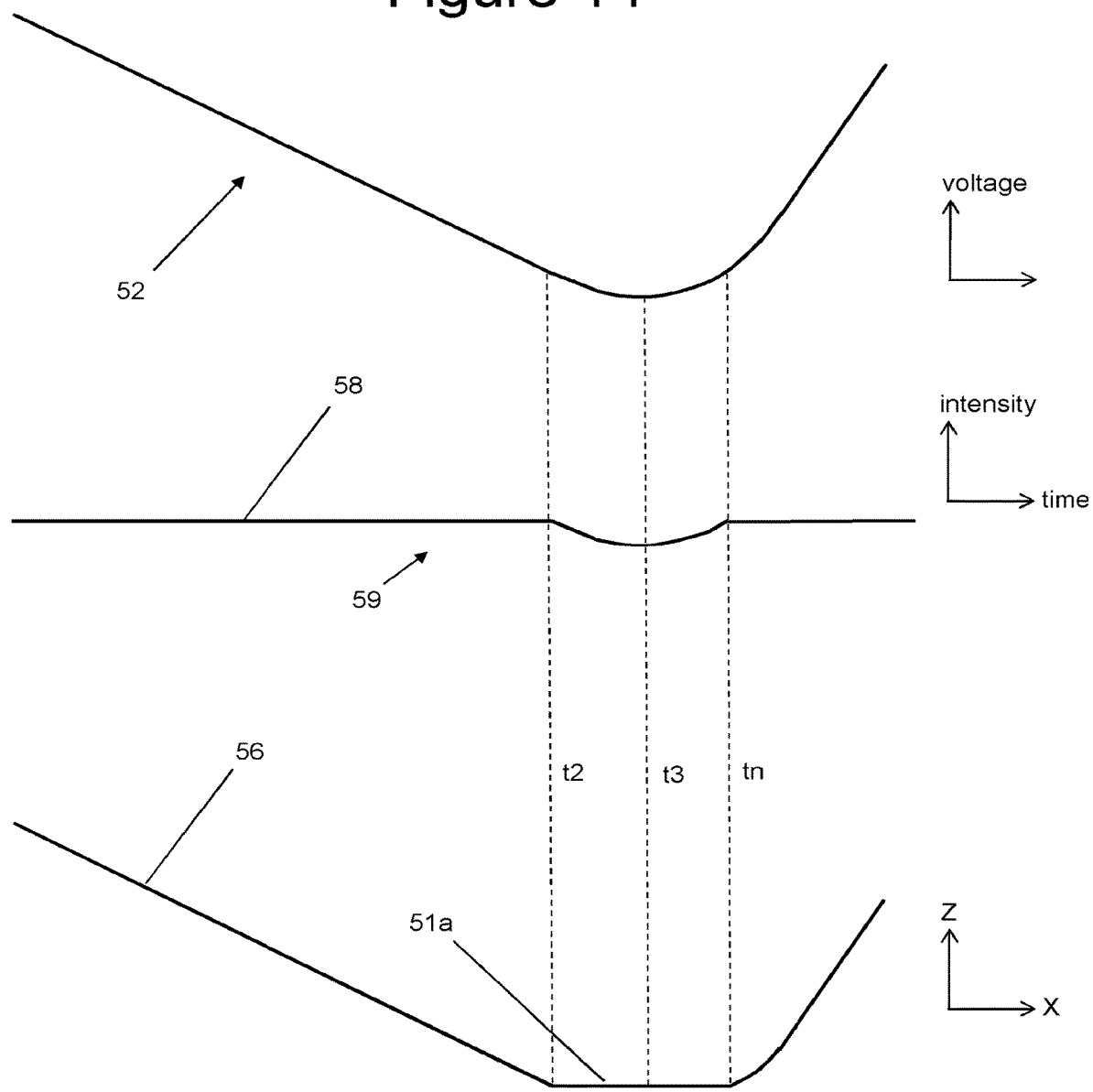
Figure 15:
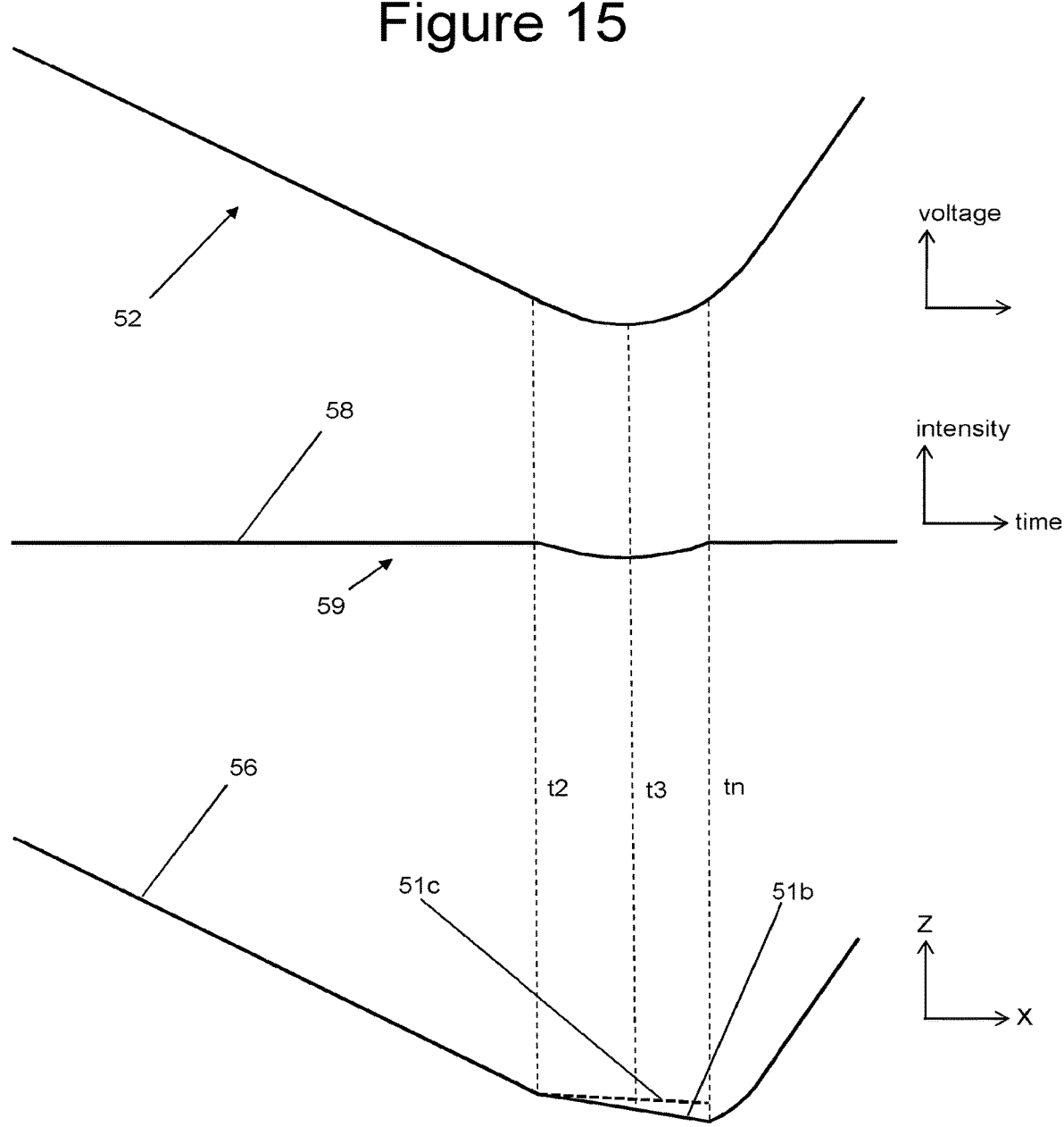

FIG. 13 is an enlarged view showing the first and second drive signals 52, 59 at time t2 and t3. At time t2 the actuation beam 32 turns off so the probe tip decelerates rapidly until it is stationary in Z and then immediately retracts as indicated at 53. Alternatively the second driver 30 may not immediately retract the probe after it has decelerated, but instead it may control the combined motion imparted to the probe tip by the first and second drivers in order to measure information about the sample (e.g. its material stiffness) during a measurement phase. FIGS. 14 and 15 give examples of how the waveform generator 40 can control the first and second drive signals during this measurement phase. In FIG. 14 the second drive signal 59 controls the probe so as to precisely cancel the motion imparted by the first drive signal 52, so the resultant combined motion of the probe tip is a measurement phase in which the height of the probe tip is held constant between time t2 and time to as indicated by a horizontal line 51a in the probe tip trajectory. Such a constant static position will provide a constant interaction with the surface of the sample, enabling multiple height measurements (or other sample interaction measurements) to be taken during the measurement phase. These multiple measurements can then be averaged to improve the signal-to-noise ratio.

In FIG. 15 the second drive signal 59 drives the probe so that probe tip rapidly decelerates, but then instead of retracting or holding the probe tip, the second drive signal 59 causes the probe tip to continue moving down during the measurement, albeit at a lower speed, as indicated by a downwardly sloping straight line 51b in the probe tip trajectory. In this example the second drive signal 59, combined with the first drive signal 42, apply a constant downward force to the probe tip which is reacted by the surface of the sample during the measurement phase. This downward force is accurately controlled, and the resulting trajectory of the probe tip during the measurement phase will depend on the stiffness of the sample. So by way of example if the surface of the sample is particularly stiff then the probe tip will follow a shallower trajectory 51c. Thus the profile of the trajectory 51b, 51c in the measurement phase can be analysed to determine the stiffness of the sample. Alternatively the application of a known downward force could be used to modify the sample for nanolithography.

In the embodiments described above, the first and second drivers generate respective first and second drive forces along drive axes which are both approximately aligned with the Z (height) direction orthogonal to the surface of the sample 7. So in these embodiments the modification of the second drive signal causes the second driver to drive the probe in direct opposition to the first drive signal. In other words, when the surface position is detected then the second driver generates a second drive force which drives the probe up (+Z) as the first driver generates a first drive force which continues to drive it down (−Z). However the described embodiments may also be implemented in a method of the type described in "Development of a 3D-AFM for true 3D measurements of nanostructures" Gaoliang Dai et a/2011 *Meas. Sci. Technol.* 22 094009 doi:10.1088/0957-0233/22/9/094009, in which a vector approach probing method is applied and the drive forces are not necessarily parallel.

Figure 16:
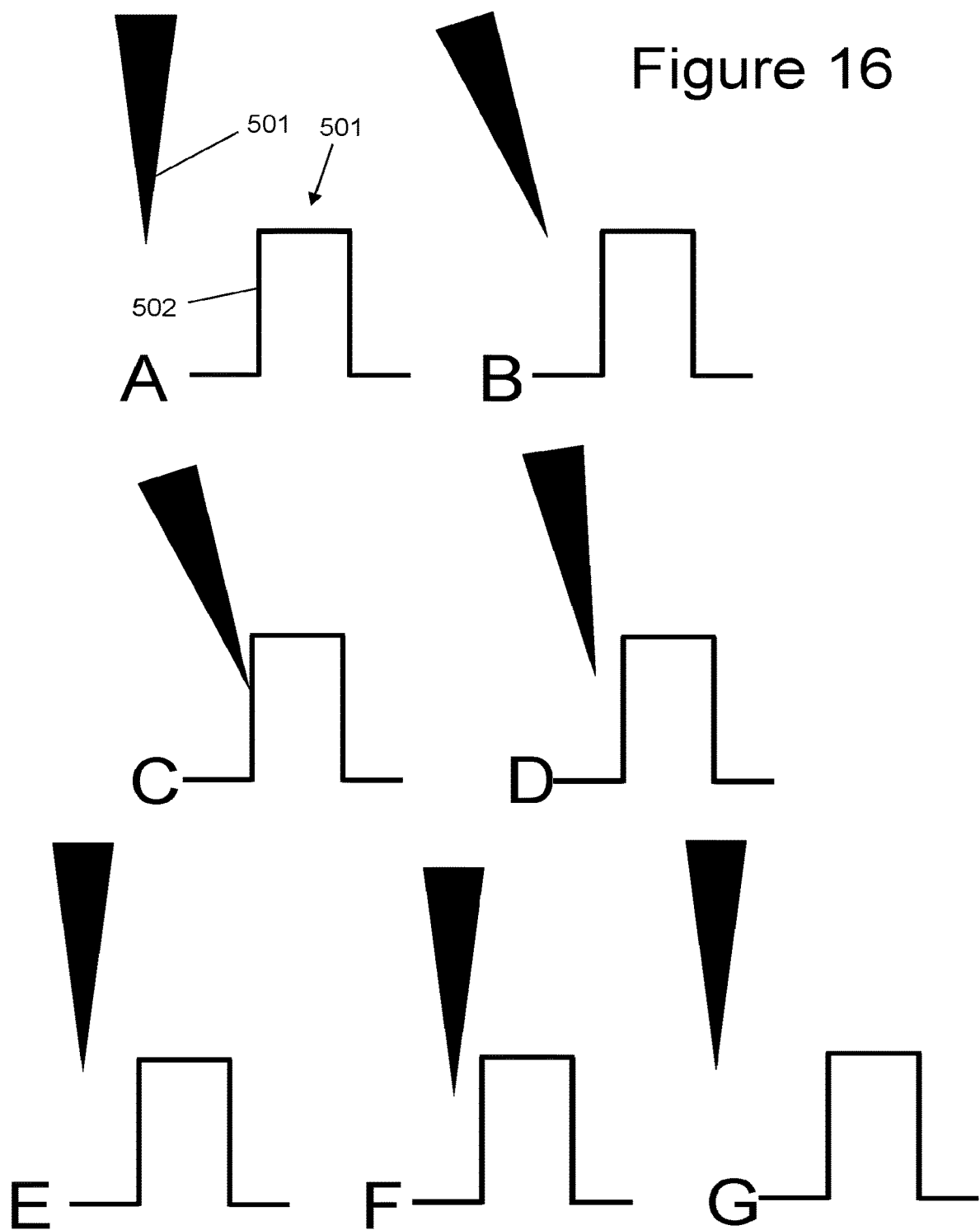
FIGS. 16A-G show the positions of a probe tip at different times during a single measurement cycle.
Figure 17:
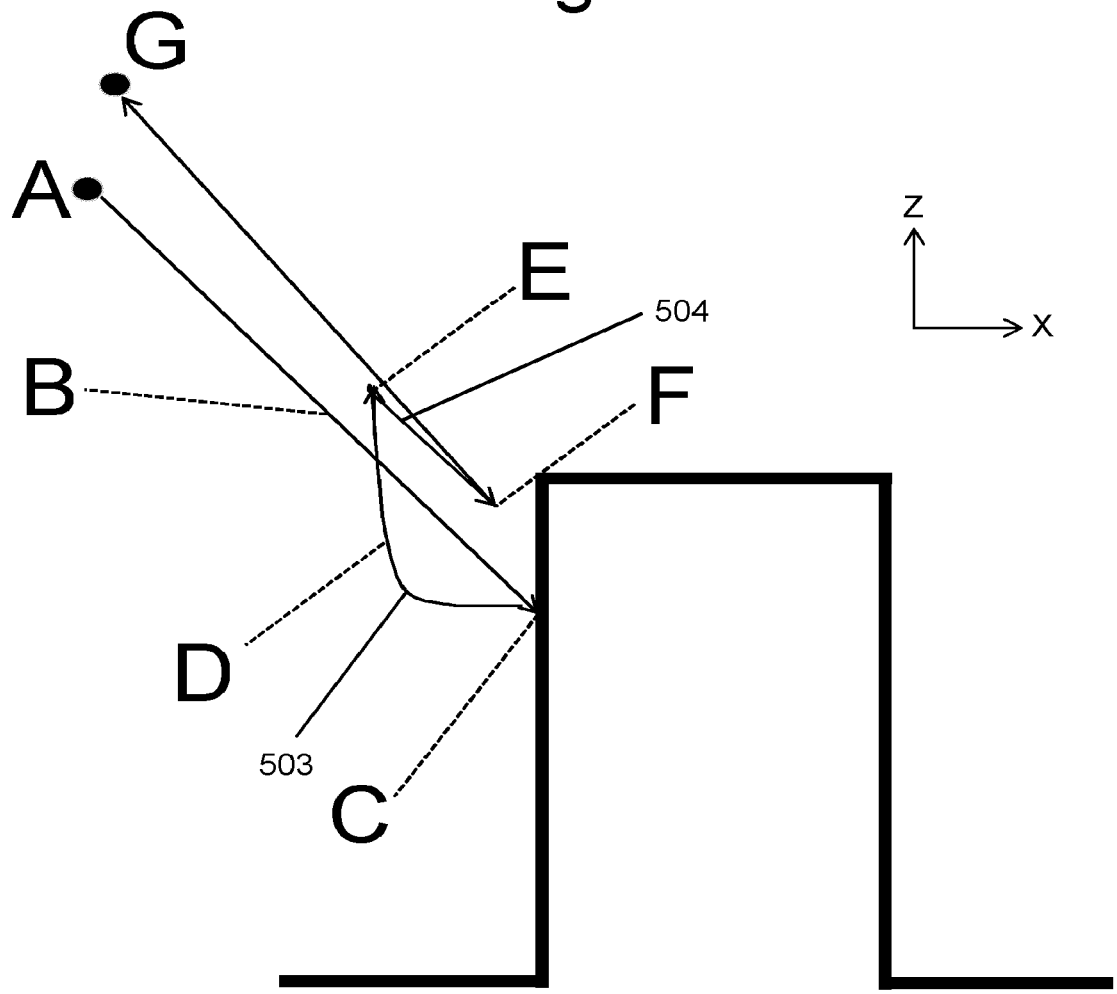
FIG. 17 shows the variation of approach angle of the probe tip between cycles as it traverses a feature.
Figure 18:
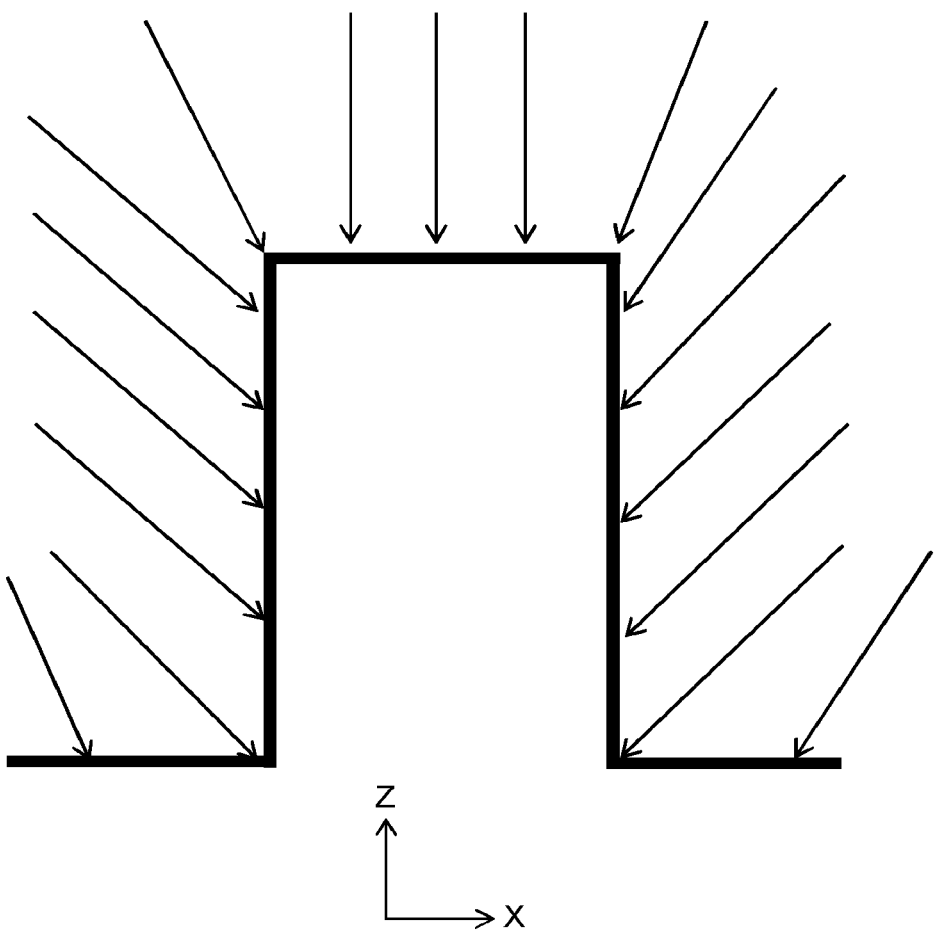
FIG. 18 shows the trajectory of the probe tip during a single measurement cycle.

FIGS. 16-18 give an example of such a vector approach probing method. FIGS. 16A-G show a succession of positions of a probe tip during a single measurement cycle probing a feature 501 with a steep vertical component, such as, the sidewall of a micro fabricated structure 502. FIG. 17 shows the trajectory of the probe tip during that cycle, and is labelled with letters A-G corresponding with FIGS. 16A-G. In FIG. 16A the probe tip is at position A in FIG. 17 ready to begin the approach phase in order to make a measurement of the sidewall 502. In FIG. 16B the probe tip is approaching the sidewall 502 driven by the first driver. In FIG. 16C the probe tip is at a surface position and a surface signal is generated. The second drive signal is modified at this point so that the probe tip rapidly retracts along a trajectory 503 to the position of FIG. 16E. Between E and F the probe tip approaches the sidewall again for a short overshoot phase 504. At F the probe tip is stationary and at the end of its approach phase. Between F and G the probe tip retracts ready for the next cycle. FIG. 18 indicates the approach trajectory of the probe tip during a series of cycles over the full surface of the feature.

The linear approach trajectory (between A and C) and the linear retract trajectory (between F and G) of the probe tip are driven by a first driver such as an XZ piezoelectric actuator which can drive the base of the cantilever in any direction in the XZ plane.

The rapid retraction between C, D and E is driven by a second driver. The second driver may be for example a laser which illuminates the cantilever to one side so as to generate torsional forces which cause the cantilever to twist along its length and the probe tip to tilt as shown in FIG. 16 (note that the cantilever extends out of the plane of FIG. 16 in the Y direction). An example of a suitable method of generating such torsional drive forces is described in WO2015/128459, the contents of which are incorporated herein by reference.

Alternatively, the first and second drivers for the embodiment of FIGS. 16-18 may be nested piezoelectric actuators similar to FIG. 8.

In this example the drive axis of the first drive force generated by the first driver varies from cycle to cycle as shown in FIG. 18, rather than always being orthogonal to the surface of the sample as in the earlier embodiments. Also it can be seen from FIG. 16 that the second driver tilts the probe tip rather than translating it, so rather than driving the probe in direct opposition to the first driver along a drive axis substantially parallel with the drive axis of the first driver, the modification of the second drive signal causes the second driver to generate a second drive force which is only partially in opposition to the first drive force so that the probe tip decelerates and then follows a curved trajectory 503.

In all of the methods described above, the first driver 4, 400 drives the base of the cantilever repeatedly towards and away from a surface of a sample in a series of cycles. The series of cycles is a continuous series of cycles—in other words each cycle in the series starts immediately after a preceding cycle in the series. For each cycle of the first drive signal 52 there is an approach phase before generation of the surface signal in which the first driver 4, 400 moves the base of the cantilever and the probe tip towards the surface of the sample, and a retract phase after generation of the surface signal in which the first driver 4, 400 moves the base of the cantilever and the probe tip away from the surface of the sample. In the case of FIGS. 10 and 11 each cycle also has a hold phase at the end of the retract phase.

For each cycle the first driver 4, 400 moves the base of the cantilever and the probe tip away from the surface of the sample only after generation of the surface signal. In other words, for each cycle the first drive signal 52 does not move the base of the cantilever and the probe tip away from the surface of the sample before generation of the surface signal.

The surface detector 22 is arranged to generate a surface signal for each cycle in the series when it detects an interaction of the probe tip with the surface of the sample. In other words there are no cycles in the series in which a surface signal is not generated, and consequently there are no cycles in the series in which the second drive signal is not modified in response to receipt of the surface signal. This is apparent from FIGS. 10 and 11 which each show a continuous series of four cycles, each cycle including a modification of the second drive signal 59; and also from FIG. 12 which shows a series of seven cycles, each cycle including a modification of the second drive signal 59.

Although the contemplated embodiments have been described above with reference to one or more preferred embodiments, it will be appreciated that various changes or modifications may be made without departing from the scope of the appended claims.

Before we refer to the appended claims, reference is first made to the following aspects of the invention.

1. A scanning probe system comprising: a probe comprising a cantilever extending from a base to a free end, and a probe tip carried by the free end of the cantilever; a first driver with a first driver input, the first driver arranged to drive the probe in accordance with a first drive signal at the first driver input; a second driver with a second driver input, the second driver arranged to drive the probe in accordance with a second drive signal at the second driver input; a control system arranged to control the first drive signal so that the first driver drives the base of the cantilever repeatedly towards and away from a surface of a sample in a series of cycles; and a surface detector arranged to generate a surface signal for each cycle when it detects an interaction of the probe tip with the surface of the sample, wherein the control system is also arranged to modify the second drive signal in response to receipt of the surface signal from the surface detector, the modification of the second drive signal causing the second driver to control the probe tip, and the control system is arranged to control the first drive signal so that for each cycle there is an approach phase before generation of the surface signal in which the first driver moves the base of the cantilever and the probe tip towards the surface of the sample, and a retract phase after generation of the surface signal in which the first driver moves the base of the cantilever and the probe tip away the surface of the sample.

2. The system of aspect 1 wherein the control system is arranged to control the first drive signal so that the first driver drives the probe tip over a first travel distance for each cycle, and the control system is also arranged to control the second drive signal so that the second driver drives the probe tip over a second travel distance for each cycle which is less than the first travel distance.

3. The system of any preceding aspect wherein the modification of the second drive signal causes the cantilever to deform so that the probe tip moves relative to the base of the cantilever.

4. The system of aspect 3 wherein the second driver is arranged to illuminate the cantilever in accordance with the second drive signal at the second driver input.

5. The system of any preceding aspect wherein the control system is arranged to control the first and second drive signals so that for each cycle there is an approach phase before generation of the surface signal in which the first driver moves the base of the cantilever and the probe tip towards the surface of the sample; a first retract phase after generation of the surface signal in which the modification of the second drive signal causes the probe tip to move away from the surface of the sample while the first driver continues to move the base of the cantilever towards the surface of the sample; and a second retract phase after the first retract phase in which the first driver moves the base of the cantilever and the probe tip away the surface of the sample.

6. The system of aspect 5 wherein the control system is arranged to control the first drive signal for each cycle so that for each cycle there is an overshoot phase between the first retract phase and the second retract phase in which the first driver moves the base of the cantilever and the probe tip towards the surface of the sample.

7. The system of any preceding aspect wherein the control system is also arranged to reset the second drive signal after it has been modified and before the next cycle, the reset of the second drive signal causing the second driver to move the probe tip towards the surface of the sample.

8. The system of any preceding aspect wherein the surface detector is arranged to direct a sensing beam onto the cantilever thereby generating a reflected sensing beam which is analysed to detect the interaction of the probe tip with the surface of the sample.

9. The system of aspect 8 wherein the surface detector comprises an interferometer which combines the reflected sensing beam with a reference beam to generate an interferogram, and generates a detection signal from the interferogram, and wherein the detection signal is analysed to detect the interaction of the probe tip with the surface of the sample.

10. The system of aspect 8 wherein the surface detector comprises an optical lever.

11. The system of aspect 10 the system further comprises a measurement system which takes a measurement from the surface of the sample for each cycle in response to receipt of the surface signal from the surface detector, wherein the measurement system comprises an interferometer arranged to combine the reflected sensing beam with a reference beam to generate an interferogram, and generate a detection signal from the interferogram.

12. The system of any preceding aspect wherein modification of the second drive signal causes the cantilever to deform so that an angle of the probe tip changes relative to the base of the cantilever; and wherein the control system is arranged to control the second drive signal so that for each cycle the second drive signal remains substantially constant as the probe tip moves towards the surface of the sample until the second drive signal is modified in response to receipt of the surface signal, thereby ensuring that when the surface signal is generated the probe tip is at a predetermined angle relative to the base of the cantilever.

13. The system of any preceding aspect wherein the control system is also arranged to modify the first drive signal in response to receipt of the surface signal, the modification of the first drive signal causing the first driver to retract the base of the cantilever away from the surface of the sample.

14. The system of any preceding aspect wherein the control system is arranged to control the first drive signal before generation of the surface signal so that the first drive signal changes in a predetermined manner which is the same for each cycle.

15. The system of any preceding aspect wherein modification of the second drive signal causes the second driver to decelerate the probe tip.

16. The system of any preceding aspect wherein the probe is mechanically responsive to first and second drive forces generated by the first and second drivers in accordance with the first and second drive signals, and the modification of the second drive signal causes the second driver to generate a second drive force which is directed away from the surface of the sample.

17. The system of any preceding aspect wherein the series of cycles is a continuous series of cycles.

18. The system of any preceding aspect wherein there are no cycles in the series in which a surface signal is not generated.

19. The system of any preceding aspect wherein there are no cycles in the series in which the second drive signal is not modified in response to receipt of the surface signal.

20. The system of any preceding aspect wherein the control system is arranged to control the first drive signal so that for each cycle the first driver moves the base of the cantilever and the probe tip away the surface of the sample only after generation of the surface signal.

21. A method of scanning a sample with a scanning probe system, the scanning probe system comprising: a probe comprising a cantilever extending from a base to a free end, and a probe tip carried by the free end of the cantilever; a first driver with a first driver input, the first driver arranged to drive the probe in accordance with a first drive signal at the first driver input; and a second driver with a second driver input, the second driver arranged to drive the probe in accordance with a second drive signal at the second driver input, the method comprising: controlling the first drive signal so that the first driver drives the base of the cantilever repeatedly towards and away from a surface of the sample in a series of cycles; generating a surface signal for each cycle on detection of an interaction of the probe tip with the surface of the sample; and modifying the second drive signal in response to receipt of the surface signal, the modification of the second drive signal causing the second driver to control the probe tip, wherein for each cycle there is an approach phase before generation of the surface signal in which the first driver moves the base of the cantilever and the probe tip towards the surface of the sample, and a retract phase after generation of the surface signal in which the first driver moves the base of the cantilever and the probe tip away the surface of the sample.

22. The method of aspect 21 wherein modification of the second drive signal causes the second driver to decelerate the probe tip.

23. The method of aspect 21 or 22 wherein the probe is mechanically responsive to first and second drive forces generated by the first and second drivers in accordance with the first and second drive signals, and the modification of the second drive signal causes the second driver to generate a second drive force which is directed away from the surface of the sample.

24. The method of aspect 21, 22 or 23 wherein the series of cycles is a continuous series of cycles.

25. The method of any of aspects 21 to 24 wherein there are no cycles in the series in which a surface signal is not generated.

26. The method of any of aspects 21 to 25 wherein there are no cycles in the series in which the second drive signal is not modified in response to receipt of the surface signal.

27. The method of any of aspects 21 to 26 wherein for each cycle the first driver moves the base of the cantilever and the probe tip away the surface of the sample only after generation of the surface signal.

28. A method of scanning a sample with a scanning probe system, the scanning probe system comprising a probe with a cantilever extending from a base to a free end, and a probe tip carried by the free end of the cantilever; the method comprising:
translating the probe tip and the base of the cantilever together repeatedly towards and away from a surface of the sample;
directing a sensing beam onto the cantilever thereby generating a reflected beam;
analysing the reflected beam to detect an interaction of the probe tip with the surface of the sample as the probe tip moves towards the surface of the sample;
generating a surface signal on detection of the interaction of the probe tip with the surface of the sample; and
in response to receipt of the surface signal, changing a shape of the cantilever so that an angle of the cantilever relative to the sensing beam changes;
wherein the angle of the cantilever relative to the sensing beam remains substantially constant as the probe tip and the base of the cantilever translate together towards the surface of the sample.

29. The method of aspect 28 wherein an average angle of the cantilever relative to the sensing beam remains substantially constant as the probe tip and the base of the cantilever translate together towards the surface of the sample.

30. A method according to aspect 28 or 29, and any of aspects 21 to 27.

31. A scanning probe system comprising:
a first driver with a first driver input;

a probe comprising a cantilever extending from the first driver from a base to a free end, and a probe tip carried by the free end of the cantilever;

wherein the first driver is arranged to translate the probe tip and the base of the cantilever together in accordance with a first drive signal at the first driver input;

a second driver with a second driver input;

wherein the second driver is arranged to change a shape of the probe in accordance with a second drive signal at the second driver input;

a control system arranged to control the first drive signal so that the first driver translates the probe tip and the base of the cantilever together repeatedly towards and away from a surface of a sample; and a surface detector which is arranged to direct a sensing beam onto the cantilever thereby generating a reflected beam which is analysed to detect an interaction of the probe tip with the surface of the sample;

wherein the surface detector is arranged to generate a surface signal for each cycle when it detects an interaction of the probe tip with the surface of the sample;

wherein the control system is arranged to modify the second drive signal in response to receipt of the surface signal from the surface detector, the modification of the second drive signal causing the cantilever to change shape so that an angle of the cantilever relative to the sensing beam changes; and wherein the control system is arranged to control the second drive signal so that the second drive signal remains substantially constant as the probe tip and the base of the cantilever translate together towards the surface of the sample.

32. The scanning probe system of aspect 31 wherein the control system is arranged to control the second drive signal so that an average of the second drive signal remains substantially constant as the probe tip and the base of the cantilever translate together towards the surface of the sample.

33. A scanning probe system according to aspect 31 or 32, and any of aspects 1 to 20.

The invention claimed is:

1. A scanning probe system comprising: a probe comprising a cantilever extending from a base to a free end, and a probe tip carried by the free end of the cantilever; a first driver with a first driver input, the first driver arranged to drive the probe in accordance with a first drive signal at the first driver input; a second driver with a second driver input, the second driver arranged to drive the probe in accordance with a second drive signal at the second driver input; a control system arranged to control the first drive signal so that the first driver drives the base of the cantilever repeatedly towards and away from a surface of a sample in a series of cycles; and a surface detector arranged to generate a surface signal for each cycle when it detects an interaction of the probe tip with the surface of the sample, wherein the control system is also arranged to modify the second drive signal in response to receipt of the surface signal from the surface detector, the modification of the second drive signal causing the second driver to control the probe tip, and the control system is arranged to control the first drive signal so that for each cycle there is an approach phase before generation of the surface signal in which the first driver moves the base of the cantilever and the probe tip towards the surface of the sample, and a retract phase after generation of the surface signal in which the first driver moves the base of the cantilever and the probe tip away the surface of the sample, wherein the system further comprises a measurement system which takes a measurement from the surface of the sample for each cycle in response to receipt of the surface signal from the surface detector.

2. The scanning probe system of claim 1, wherein the control system is arranged to control the first drive signal so that the first driver drives the probe tip over a first travel distance for each cycle, and the control system is also arranged to control the second drive signal so that the second driver drives the probe tip over a second travel distance for each cycle which is less than the first travel distance.

3. The scanning probe system of claim 1, wherein the modification of the second drive signal causes the cantilever to deform so that the probe tip moves relative to the base of the cantilever.

4. The scanning probe system of claim 1, wherein the second driver is arranged to illuminate the cantilever in accordance with the second drive signal at the second driver input.

5. The scanning probe system of claim 1, wherein the control system is arranged to control the first and second drive signals so that for each cycle there is an approach phase before generation of the surface signal in which the first driver moves the base of the cantilever and the probe tip towards the surface of the sample; a first retract phase after generation of the surface signal in which the modification of the second drive signal causes the probe tip to move away from the surface of the sample while the first driver continues to move the base of the cantilever towards the surface of the sample; and a second retract phase after the first retract phase in which the first driver moves the base of the cantilever and the probe tip away the surface of the sample.

6. The scanning probe system of claim 5, wherein the control system is arranged to control the first drive signal for each cycle so that for each cycle there is an overshoot phase between the first retract phase and the second retract phase in which the first driver moves the base of the cantilever and the probe tip towards the surface of the sample.

7. The scanning probe system of claim 1, wherein the control system is also arranged to reset the second drive signal after it has been modified and before the next cycle, the reset of the second drive signal causing the second driver to move the probe tip towards the surface of the sample.

8. The scanning probe system of claim 1, wherein the surface detector is arranged to direct a sensing beam onto the cantilever thereby generating a reflected sensing beam which is analysed to detect the interaction of the probe tip with the surface of the sample.

9. The scanning probe system of claim 1, wherein modification of the second drive signal causes the cantilever to deform so that an angle of the probe tip changes relative to the base of the cantilever; and wherein the control system is arranged to control the second drive signal so that for each cycle the second drive signal remains substantially constant as the probe tip moves towards the surface of the sample until the second drive signal is modified in response to receipt of the surface signal, thereby ensuring that when the surface signal is generated the probe tip is at a predetermined angle relative to the base of the cantilever.

10. The scanning probe system of claim 1, wherein the control system is also arranged to modify the first drive signal in response to receipt of the surface signal, the modification of the first drive signal causing the first driver to retract the base of the cantilever away from the surface of the sample.

11. The scanning probe system of claim 1, wherein the control system is arranged to control the first drive signal before generation of the surface signal so that the first drive signal changes in a predetermined manner which is the same for each cycle.

12. The scanning probe system of claim 1, wherein modification of the second drive signal causes the second driver to decelerate the probe tip.

13. The scanning probe system of claim 1, wherein the probe is mechanically responsive to first and second drive forces generated by the first and second drivers in accordance with the first and second drive signals, and the modification of the second drive signal causes the second driver to generate a second drive force which is directed away from the surface of the sample.

14. The scanning probe system of claim 1, wherein the series of cycles is a continuous series of cycles.

15. The scanning probe system of claim 1, wherein there are no cycles in the series in which a surface signal is not generated.

16. The scanning probe system of claim 1, wherein there are no cycles in the series in which the second drive signal is not modified in response to receipt of the surface signal.

17. The scanning probe system of claim 1, wherein the control system is arranged to control the first drive signal so that for each cycle the first driver moves the base of the cantilever and the probe tip away the surface of the sample only after generation of the surface signal.

18. A method of scanning a sample with a scanning probe system, the scanning probe system comprising a probe with a cantilever extending from a base to a free end, and a probe tip carried by the free end of the cantilever; the method comprising:
  translating the probe tip and the base of the cantilever together repeatedly towards and away from a surface of the sample;
  directing a sensing beam onto the cantilever thereby generating a reflected beam;
  analysing the reflected beam to detect an interaction of the probe tip with the surface of the sample as the probe tip moves towards the surface of the sample;
  generating a surface signal on detection of the interaction of the probe tip with the surface of the sample; and
  in response to receipt of the surface signal, changing a shape of the cantilever so that an angle of the cantilever relative to the sensing beam changes;
  wherein the angle of the cantilever relative to the sensing beam remains substantially constant as the probe tip and the base of the cantilever translate together towards the surface of the sample.

19. The method of claim 18 wherein an average angle of the cantilever relative to the sensing beam remains substantially constant as the probe tip and the base of the cantilever translate together towards the surface of the sample.

20. A method of scanning a sample with a scanning probe system, the scanning probe system comprising: a probe comprising a cantilever extending from a base to a free end, and a probe tip carried by the free end of the cantilever; a first driver with a first driver input, the first driver arranged to drive the probe in accordance with a first drive signal at the first driver input; and a second driver with a second driver input, the second driver arranged to drive the probe in accordance with a second drive signal at the second driver input, the method comprising: controlling the first drive signal so that the first driver drives the base of the cantilever repeatedly towards and away from a surface of the sample in a series of cycles; generating a surface signal for each cycle on detection of an interaction of the probe tip with the surface of the sample; taking a measurement from the surface of the sample for each cycle in response to receipt of the surface signal from the surface detector; and modifying the second drive signal in response to receipt of the surface signal, the modification of the second drive signal causing the second driver to control the probe tip, wherein for each cycle there is an approach phase before generation of the surface signal in which the first driver moves the base of the cantilever and the probe tip towards the surface of the sample, and a retract phase after generation of the surface signal in which the first driver moves the base of the cantilever and the probe tip away from the surface of the sample.

* * * * *